(12) United States Patent
Chen et al.

(10) Patent No.: US 8,239,341 B2
(45) Date of Patent: Aug. 7, 2012

(54) METHOD AND APPARATUS FOR PATTERN MATCHING

(75) Inventors: Zhongliang Chen, Beijing (CN); Lida Zhang, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 638 days.

(21) Appl. No.: 12/513,650

(22) PCT Filed: Nov. 16, 2007

(86) PCT No.: PCT/CN2007/071080
§ 371 (c)(1),
(2), (4) Date: May 5, 2009

(87) PCT Pub. No.: WO2008/067743
PCT Pub. Date: Jun. 12, 2008

(65) Prior Publication Data
US 2010/0076919 A1     Mar. 25, 2010

(30) Foreign Application Priority Data

Dec. 8, 2006  (CN) .......................... 2006 1 0161982
Jan. 19, 2007  (CN) .......................... 2007 1 0062880
Jan. 19, 2007  (CN) .......................... 2007 1 0062881

(51) Int. Cl.
G06F 17/00   (2006.01)
G06N 5/02    (2006.01)

(52) U.S. Cl. ................. 706/48; 706/46; 706/47

(58) Field of Classification Search ...................... 706/48
See application file for complete search history.

(56) References Cited

U.S. PATENT DOCUMENTS

| | | | |
|---|---|---|---|
| 6,785,291 B1 * | 8/2004 | Cao et al. ..................... | 370/431 |
| 7,936,757 B2 * | 5/2011 | Zhang et al. ................. | 370/392 |
| 2003/0229708 A1 | 12/2003 | Lie et al. | |

FOREIGN PATENT DOCUMENTS

| | | |
|---|---|---|
| CN | 1980240 A | 6/2007 |
| CN | 101009660 A | 8/2007 |
| CN | 101026576 A | 8/2007 |
| CN | 101154228 A | 4/2008 |
| CN | 101258721 | 9/2008 |
| JP | 2006309290 A | 11/2006 |
| WO | WO 01/56327 | 8/2001 |

OTHER PUBLICATIONS

Wangjie et al., "An Optimizing AC Algorithm for Intrusion Detection System," *China Academic Journal Electronic Publishing House*, pp. 146-149 (1994).

* cited by examiner

*Primary Examiner* — Michael B Holmes
(74) *Attorney, Agent, or Firm* — Marshall, Gerstein & Borun LLP

(57) ABSTRACT

A method of pattern matching applicable to a transmission flow which is divided into multiple segments is provided, including: determining whether there is flow status information corresponding to a current pattern for a transmission flow to which a current segment belongs; creating the flow status information corresponding to the current pattern for the transmission flow if there is no flow status information corresponding to the current pattern for the transmission flow to which the current segment belongs; performing pattern matching for the current segment by taking the flow status information as assistant information of the pattern matching. An apparatus of pattern matching applicable to a transmission flow which is divided into multiple segments is also provided, including a flow status information configuration module and a pattern matching processing module. The solution of the present invention can avoid the defects caused by flow-reassembly.

29 Claims, 16 Drawing Sheets

METHOD AND APPARATUS FOR PATTERN MATCHING

CROSS-REFERENCE TO RELATED APPLICATIONS

This is the U.S. national phase of International Application No. PCT/CN2007/071080, filed Nov. 16, 2007, which claims the priority benefit of Chinese Patent Application No. 200610161982.8 filed Dec. 8, 2006; Chinese Patent Application No. 200710062881.X filed Jan. 19, 2007; and Chinese Patent Application No. 200710062880.5 filed Jan. 19, 2007, the entire respective disclosures of which are incorporated herein by reference.

FIELD OF THE INVENTION

The present invention relates to a method and apparatus for segment-based pattern matching in a communication system.

BACKGROUND OF THE INVENTION

Pattern matching is a method generally used in a communication system for managing and detecting transmission contents. Both gateway apparatus and bypass apparatus are able to implement upper-layer applications, such as network security, anti-virus (AV), bandwidth management, application recognizing, security detection and wide area network acceleration, through pattern matching. The method of pattern matching is a basis for constructing a content detection engine with high performance for network apparatus. The implementation of the pattern matching is a technical foundation for constructing a manageable and operable secure intelligent network.

Currently, there are mainly two methods of pattern matching, single-pattern matching and multi-pattern matching. The single-pattern matching refers that only one pattern string can be matched in a text string at one time, such as Boyer Moore (BM) algorithm, Brute force (BF) algorithm and Perl Compatible Regular Expression (PCRE) algorithm, etc. Especially, the MB algorithm, with relative higher precision, is able to give attention to both character matching and policy matching at the same time. The multi-pattern matching refers to performing matching for multiple pattern strings at the same time, e.g. Aho-Corasick (AC) algorithm.

Currently, both the single-pattern matching and the multi-pattern matching must be performed based on text continuity of a transmission flow. In practical applications, each text is divided into a plurality of segments for transmission in the network, which results in the difficulty in the pattern matching in the network. Currently, a solution in common use is to perform flow-reassembly for the segments, e.g. perform the flow-reassembly by taking a protocol format of the transmission flow such as a User Datagram Protocol (UDP), Internet Control Message Protocol (ICMP), or Transfer Control Protocol (TCP) as a pseudo-Flow, to save the segments and recover the segments, then perform the pattern matching for the reassembled continuous text.

This flow-reassembly method can provide continuous text required by the pattern matching, but also causes many problems.

First, the flow-reassembly makes modification of a protocol stack of the network device, such as TCP/IP protocol stack, become necessary, which destroys the integrity of the protocol stack and increases the fault possibility of the network device.

Second, the flow-reassembly necessitates caching segments of each text until the pattern matching is finished, which occupies a great deal of system memory, decreases system performance and also increases the possibility of DoS/DDos. On the other hand, because the system preserves memory for each text and only limited memory can be preserved, false negative is inevitable. In addition, caching the segments leads to a longer delay. For delay-sensitive services, such as Voice over IP (VoIP) services and video services, the delay will decrease the quality of services.

To control the occupation of the memory, a solution is currently proposed in which application protocols are divided into a row-mode and a length-mode before the flow-reassembly. As to the application protocols organizing packets in "rows", a row of packets are cached at most. As to the application protocols which do not organize packets in rows, the packets are cached according to a defined packet length so as to control the occupation of the memory. Although this solution can improve the control on the memory occupation, improve the system performance to some extent and decrease the possibility that the system being attacked, it cannot overcome the defect of high memory occupation radically. It cannot avoid the delay caused by the modification of the protocol stack and the caching of segments, false negative and false positive either. Especially to the algorithms such as the BM algorithm, which also consider policy matching, the occupation of memory will be greater than that of ordinary AC algorithm.

Currently, there is no method of pattern matching which is not relied upon the flow-reassembly. In other words, there is currently no such a method of pattern matching which can implement pattern matching efficiently, accurately and intelligently based on a segment rather than flow-reassembly without modifying the protocol stack of the network device, caching large amount of segments and avoiding the problems caused by memory occupation and cache delay.

SUMMARY OF THE INVENTION

Embodiments of the present invention provide a method of pattern matching, which can avoid defects caused by flow-reassembly.

The method for pattern matching, applicable to a transmission flow which is divided into multiple segments, includes:

determining whether there is flow status information corresponding to a current pattern for a transmission flow to which a current segment belongs;

creating the flow status information corresponding to the current pattern for the transmission flow if there is no flow status information corresponding to the current pattern for the transmission flow to which the current segment belongs;

performing pattern matching for the current segment by taking the flow status information as assistant information of the pattern matching.

Embodiments of the present invention also provide an apparatus of pattern matching, which can avoid the defects caused by flow-reassembly.

The apparatus of pattern matching applicable to a transmission flow which is divided into multiple segments includes: a flow status information configuration module and a pattern matching processing module; where the flow status information configuration module is configured to determine whether there is flow status information corresponding to a current pattern for a transmission flow to which a current segment belongs; indicate the flow status information to the pattern matching processing module if there is the flow status information corresponding to the current pattern for the transmission flow to which the current segment belongs; create the flow status information and indicate the flow status information created to the pattern matching processing module if there is no flow status information corresponding to the current pattern for the transmission flow to which the current segment belongs; and the pattern matching processing module is configured to take the flow status information indicated by the flow status information configuration module as assistant information of the pattern matching, and perform the pattern matching for the current segment using the assistant information of the pattern matching.

In embodiments of the present invention, the flow status information is taken as assistant information for the pattern matching. In case of single-pattern matching, the flow status information may reflect postfix information of a previous segment. Therefore, the previous segment can be combined with the current segment according to the flow status information when performing the pattern matching. Thus, the pattern matching can be performed successfully without the flow-reassembly. In case of multi-pattern matching, the flow status information can reflect the current state of a Finite State Machine (FSM). Therefore, the pattern matching for the current segment can be started from the current state of the FSM when performing pattern matching. Thus, it is also not necessary to perform the flow-reassembly to ensure the success of the pattern matching. It can be seen that the pattern matching in embodiments of the present invention is no longer relied upon the flow-reassembly. Therefore it is not necessary to perform operations needed by the flow-reassembly, such as modifying the protocol stack and caching a large amount of segments. The pattern matching provided by embodiments of the present invention effectively simplifies the operations, reduces memory occupation and decreases time delay and false negative during the pattern matching. On the other hand, the pattern matching provided by embodiments of the present invention is a universal solution applicable to both the single-pattern matching and the multi-pattern matching.

DETAILED DESCRIPTION OF THE INVENTION

The present invention will be described in detail hereinafter with reference to accompanying drawings and embodiments.

Embodiments of the present invention introduce flow status information as assistant information for the pattern matching. Under the assistance of the flow status information, corresponding pattern matching is performed for a current segment. As to the single-pattern matching, the flow status information may include postfix information of a previous segment of the current segment, a match start position and a match end position of a first matching rule, etc. For the multi-pattern matching, the flow status information may include a current state of the FSM, etc.

The pattern matching described hereinafter is performed after a sequence keeping operation to the segments of the received transmission flow.

Figure 1:
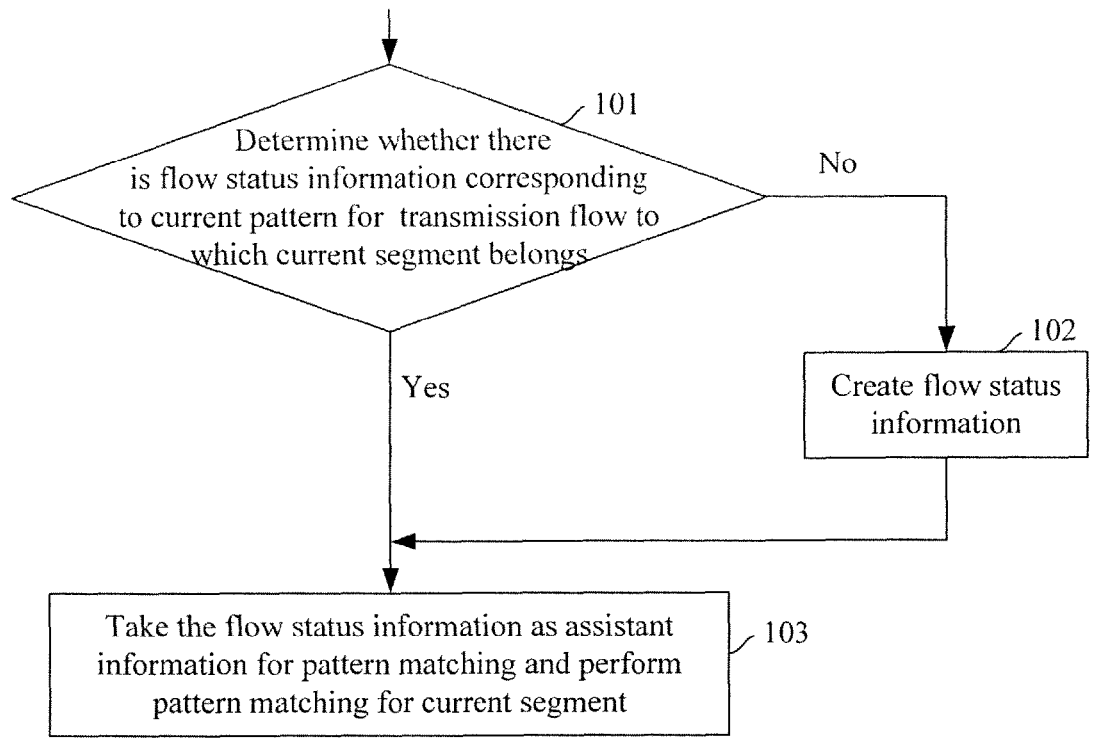
FIG. 1 is a schematic diagram illustrating a method of pattern matching according to an embodiment of the present invention.

FIG. 1 is a flowchart illustrating a method of pattern matching according to an embodiment of the present invention. As shown in FIG. 1, the method includes:

Blocks 101-102: It is determined whether there is flow status information corresponding to the current pattern for the transmission flow to which the current segment belongs. If there is the flow status information corresponding to the current pattern for the transmission flow to which the current segment belongs, Block 103 is performed; otherwise, flow status information is created and Block 103 is performed.

Block 103: The flow status information is taken as assistant information for the pattern matching and the pattern matching is performed for the current segment according to the assistant information.

In the above procedure, the flow status information is taken as the assistant information for the pattern matching. In case of single-pattern matching, because the flow status information may reflect the postfix information of the previous segment, the flow status information may further be used to associate the previous segment with the current segment when performing the pattern matching. Therefore, the pattern matching can be carried out successfully without the flow-reassembly. In case of multi-pattern matching, the flow status information may reflect the current state of the FSM. Thus, the pattern matching of the current segment may be started from the current state of the FSM. It is not necessary to perform the flow-reassembly to ensure the success of the pattern matching either. It can be seen that the pattern matching according to embodiments of the present invention no longer takes the flow-reassembly as a premise. Therefore, the operations necessitated by the flow-reassembly such as modifying the protocol stack and caching a large amount of packets are not needed in embodiments of the present invention, which simplifies operations of the pattern matching, decreases the memory occupation, the time delay as well as false negative during the pattern matching. In addition, the pattern matching provided by embodiments of the present invention is a universal solution applicable to both the single-pattern matching and the multi-pattern matching.

Figure 2:
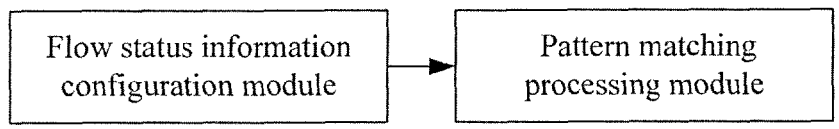
FIG. 2 is a schematic diagram illustrating an apparatus of pattern matching according to an embodiment of the present invention.

Accordingly, FIG. 2 is a schematic diagram illustrating an apparatus of pattern matching according to an embodiment of the present invention. As shown in FIG. 2, the apparatus includes: a flow status information configuration module and a pattern matching processing module. The flow status information configuration module is configured to determine whether there is flow status information corresponding to the current pattern for the transmission flow to which the current segment belongs, if there is the flow status information corresponding to the current pattern for the transmission flow to which the current segment belongs, indicate the flow status information to the pattern matching processing module; otherwise, create the flow status information, and indicate the flow status information to the pattern matching processing module. The pattern matching processing module is configured to perform the pattern matching for the current segment by taking the flow status information indicated by the flow status information configuration module as assistant information for the pattern matching.

Seven embodiments are given hereinafter to describe detailed implementations of the pattern matching of the present invention in practical applications. Embodiments 1 to 5 are for the single-pattern matching, in which the flow status information mainly stores the postfix information of the previous segment. When performing the pattern matching, the postfix information of the previous segment is combined with the current segment to form a target segment for which the pattern matching is performed. Embodiments 6 and 7 are for the multi-pattern matching. The flow status information mainly stores the state of the FSM after a previous state transition. During the pattern matching, the state of the FSM in the flow status information is taken as a start state of the FSM for the current pattern matching for the current segment.

Embodiment 1

This embodiment relates to the single-pattern matching. Taking the BF algorithm as an example, the flow status information includes the postfix information of the previous segment, the match start position and the match end position of a first matching rule; where the postfix information of the previous segment indicates a character in the previous segment that may meet a matching rule after combined with the current segment.

Figure 3:
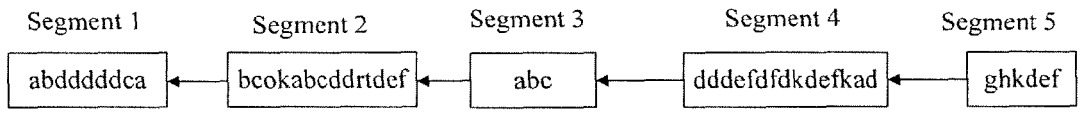
FIG. 3 shows a transmission flow divided into five segments in embodiment 1 of the present invention.

For convenience, it is supposed that the transmission flow in this embodiment is a TCP flow with the text of "abdddddcabcokabcddrtdefabcdddefdfdkdefkadghkdef" and that the matching rules are ABC, where rule A is: "abc" offset 3 depth 50, rule B is "def" distance 4 within 10, rule C is "ghk" distance 3 within 8. During the pattern matching, searching for patterns meeting rules A, B and C in the transmission flow with the text of "abdddddcabcokabcddrtdefabcdddefdfdkdefkadghkdef". In other words, searching for a matching object "abc" in the contents with length 50 from offset 3 in the transmission flow, searching for a matching object "def" in the contents with length 4 starting from offset 4 of the position where A is matched, and searching for a matching object "ghk" in the contents with length 8 starting from offset 3 of the position where B is matched. If the rules ABC are successfully matched, it means that the pattern matching for the transmission flow succeeds. Meanwhile, during network transmission, the above transmission flow will be divided into five segments according to the TCP. FIG. 3 illustrates the transmission flow divided into five segments in this embodiment.

Figure 4:
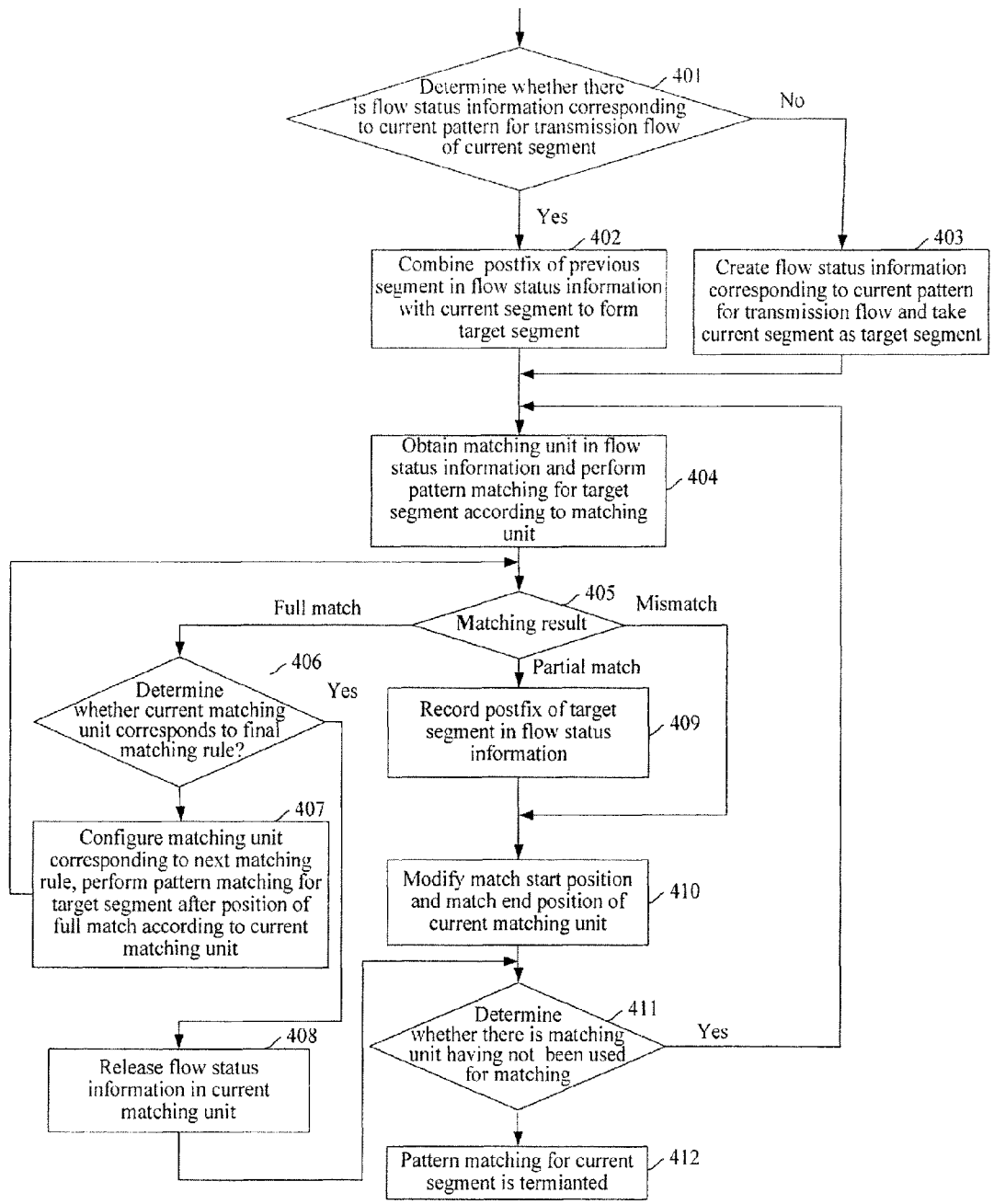
FIG. 4 is a flowchart illustrating a method of pattern matching according to embodiment 1 of the present invention.

FIG. 4 is a flowchart illustrating a method of pattern matching according to embodiment 1 of the present invention. As shown in FIG. 4, the method includes:

Block 401: It is determined whether there is flow status information corresponding to the current pattern for the transmission flow of the current segment, if there is the flow status information corresponding to the current pattern for the transmission flow of the current segment, Block 402 is performed; otherwise, Block 403 is performed.

In this embodiment, because caching the segments is replaced by recording flow status information of the transmission flow corresponding to each matching pattern, the flow-reassembly is not necessary. In addition, a transmission flow, when in different service applications, may correspond to different matching patterns. Therefore, the transmission flow and the matching pattern are taken as differentiating characteristics for the flow status information in this embodiment.

For convenience, the flow status information corresponding to the transmission flow of the current segment with the current matching pattern is called flow status information for short.

Block 402: The postfix of a previous segment of the current segment in the flow status information is combined with the current segment to form a target segment and Block 404 is performed.

If it is determined that there is the flow status information in Block 401, it indicates that the current segment is not the first segment of the transmission flow. This embodiment is for the single-pattern matching, and therefore, the flow status information stores at least the postfix of the previous segment, the match start position and the match end position of a first matching rule. Because the postfix of the previous segment may meet a matching rule after combined with the beginning part of the current segment, the contents of the current segment is arranged behind the postfix of the previous segment in this embodiment during the combination to form a pattern matching object, i.e. a target segment in the subsequent Blocks. Taking the transmission flow shown in FIG. 3 as an example, after the pattern matching, the postfix character "a" of segment 1 after combined with the beginning part of segment 2 may form "abc" of matching rule A. Therefore, postfix character "a" of segment 1 is saved in the flow status information. During the pattern matching for segment 2, character "a" is combined with segment 2 to form the target segment "abcokabcddrtdef".

If the previous segment has no character which may meet the matching rule after combined with the current segment, it is not necessary to save the postfix of the previous segment. At this point, the postfix of the previous segment in the flow status information may be regarded as null. As such, whether the postfix of the previous segment in the flow status information is null may be determined before the combination of this Block. If the postfix of the previous segment is null, the current segment is taken as the target segment directly and Block 404 is performed; otherwise, the combination of this Block is performed.

Block 403: Flow status information corresponding to the current pattern for the transmission flow is created and the current segment is taken as the target segment.

The creation of the flow status information corresponding to the current pattern for the transmission flow of the current segment mainly includes: 1) creating a first matching unit, and recording rule information, a match start position and a match end position of a matching rule in the current pattern into the first matching unit; 2) configuring a designated unit to record a pre-stored character, clearing a space allocated to the pre-stored character in the designated unit. The pre-stored character is the postfix of the previous segment.

Taking the segments shown in FIG. 3 as an example, when segment 1 is received, there is no flow status information corresponding to matching rules ABC. Therefore, the flow status information need be created. Specifically, the creation includes recording rule information such as the match object "abc", offset 3 and length 50 in matching rule A. Because the matching is performed from the first character of segment 1, the match start position is "1". The offset of matching rule A is 3 characters and the match length is 50 characters. Therefore, the match end position is "53". Therefore, the match start position "1" and the match end position "53" are recorded in the flow status information.

It should be noted that the designated unit to record the pre-stored character may be a fixed matching unit such as the first matching unit or the current matching unit or a byte area separately defined in a storage space. The size of the space preserved for the pre-stored character may be determined according to a maximum length of one of the match objects of all the matching rules. For example, each of the match objects of the matching rules ABC in this embodiment includes three characters. Thus, a space with 3 bytes can meet the requirement. In case that the designated unit is a byte area defined separately, it is not necessary to save the postfix in each piece of flow status information, which is especially applicable to the case that there are repeated contents in multiple matching rules. According to simulation results, this manner can improve the capability of packet processing by 10 levels.

Hereinafter, the case that the first matching unit is taken as the designated unit and only one copy of the pre-stored character is saved is taken as an example.

Blocks 404-405: A matching unit is obtained from the flow status information and the obtained matching unit is taken as the current matching unit. The pattern matching is performed for the target segment according to the current matching unit. If a matching result is full match, Block 406 is performed; if the matching result is partial match, Block 409 is performed; if the matching result is mismatch, Block 410 is performed.

The matching unit may be obtained according to the order of the matching units in the flow status information, or may be obtained randomly. If it is the first time to perform the pattern matching for the target segment immediately after the flow status information is created, only one matching unit is in the flow status information. Thus, only the first matching unit can be obtained.

The pattern matching is performed according to the rule information, the match start position and the match end position in the obtained matching unit. If the target segment includes all the match objects in the rule information, it is determined that the matching result is full match; if the target segment includes at least one character consistent with part of the match objects in the rule information, it is determined that the matching result is partial match; if the target segment includes no character consistent with the match objects in the rule information, it is determined that the matching result is mismatch.

Blocks 406-408: It is determined whether the current matching unit corresponds to the final matching rule; if the current matching unit corresponds to the final matching rule, the flow status information in the current matching unit is released and Block 411 is performed; otherwise, a matching unit corresponding to a next matching rule is configured, the pattern matching is performed for the part of the target segment after the position of full match according to the current matching unit and Block 405 is performed again.

In order to decrease the system cost, the flow status information in the current matching unit may be released after it is determined that the current matching unit corresponds to the final matching rule and the obtained matching result is full match. If the system requires stopping subsequent segments after a segment fully matched with all the matching rules is detected, the pattern matching for the transmission flow of the current segment may be terminated if the current matching unit corresponds to the final matching unit and the matching result is full match, and all the flow status information of the transmission flow is released accordingly.

If there are still subsequent matching rules, a matching unit corresponding to the next matching rule is configured in this embodiment. The matching unit records rule information, a match start position and a match end position of the next matching rule. In addition, because the segment may accord with the current matching rule at several positions, the current matching unit is utilized again to perform the pattern matching for the part of the target segment after the position of full match. And subsequent processing is determined according to the matching result obtained in the pattern matching of the second time. There is no sequence requirement between the configuration of the matching unit corresponding to the next matching rule and the performing of the pattern matching of the second time.

Taking the transmission flow shown in FIG. 3 and matching rules ABC as an example, the postfix "a" of segment 1 is recorded after the pattern matching for segment 1. When the pattern matching is performed for segment 2, the recorded "a" is combined with the contents of segment 2 to form a target segment "abcokabcddrtdef". Because there is still the string "abc" in the target segment fully matched with matching rule A and matching rule A is not the final matching rule, a matching unit corresponding to matching rule B is created. The matching unit corresponding to matching rule B records the rule information of matching rule B such as match object "def", offset 4 and length 10, and also records the match start position "8" and the match end position "18" of matching rule B. In addition, the pattern matching according to matching rule A is performed again for the target segment from the fourth character of the target segment. Because the string "abc" fully matched with matching rule A can still be found, i.e. the matching result is full match, another matching unit corresponding to matching rule B is created, which records rule information of matching rule B such as the match object "def", offset 4 and length 10, and also records match start position "13" and match end position "23" of matching rule B. The pattern matching for the target segment is performed according to matching rule A again from the ninth character of the target segment. The result is mismatch. Then Block 411 is performed.

Block 409: The postfix of the target segment is recorded in the flow status information.

If the matching result in Block 405 is partial match, the postfix of the target segment which may meet a matching rule after combined with the next segment is recorded. The postfix is recorded in the designated unit configured in Block 403.

In order to ensure that no information of any matching unit is lost, whether there is recorded postfix in the flow status information is checked before recording the postfix in the flow status information; if there is the recorded postfix in the flow status information, the postfix to be recorded is compared with the recorded postfix, and the postfix with a larger number of characters is saved; otherwise, the postfix to be recorded is directly saved. Still take the transmission flow shown in FIG. 3 as an example, the last postfix character of segment 1 is "a". When performing the pattern matching for segment 1 according to matching rule A, the postfix character "a" obviously matches the first character in the match object "abc" of matching rule A, which means that the final character "a" of segment 1 may be combined with segment 2 to form "abc" which meets matching rule A. Therefore, if there is no postfix in the flow status information, the character "a" is saved in the designated unit.

Furthermore, in case that the designated unit is a fixed matching unit or a separately defined byte area, a relative position needs to be recorded in the current matching unit after recording the postfix of the target segment. The relative position refers to a forward-offset of the effective characters in the recorded postfix from the match end position. For example, when there are matching rules "abcd", "bcde" and "cdf" in the matching pattern, supposing the final characters of the target segment is "xxabc", thus characters "abc" are taken as the postfix and saved in the space preserved for the pre-stored character in the designated unit. Then a link to the space of the pre-stored character is configured respectively for the flow status information of each matching rule, i.e. the relative position is recorded in the current matching unit.

With respect to matching rule "abcd", in the recorded postfix, characters "abc" are all effective characters under this rule. Therefore, the relative position is 3. With respect to rule "bcde", the relative position is 2. With respect to rule "cdf", the relative position is 1.

For another example, when the matching rule of a matching unit is "def" and the matching rule of another matching unit is "tdef", if the final characters of a segment are "tde", there may be the following two cases according to a match order of the two matching units, randomly or in sequence.

First, if the matching unit of the pattern matching performed firstly corresponds to rule "def", characters "de" are recorded as the postfix and the relative position 2 is recorded in the current matching unit. When performing the pattern matching of the next matching unit, whether there is recorded postfix in the flow status information is checked, if there is the recorded postfix in the flow status information, the comparison is performed. Because the length of characters "tde" is larger than that of characters "de", the pre-stored character is updated to be "tde", and the relative position 3 is saved in the current matching unit.

Second, if the matching unit of the pattern matching performed firstly corresponds to rule "tdef", characters "tde" need be recorded as the postfix and the relative position 3 is recorded in the current matching unit. When performing the pattern matching for the next matching unit, whether there is recorded postfix in the flow status information is checked, and if there is the recorded postfix in the flow status information, the comparison is performed. Because the length of characters "tde" is larger than that of characters "de", the pre-stored character keeps unchanged and is still characters "tde", while the relative position 2 is saved in the current matching unit.

Block 410: The match start position and the match end position of the current matching unit are modified according to the length of the target segment.

In non-cross-packet case, matching rules ABC are taken as an example, the pattern matching is performed for a continuous text according to matching rules A, B and C. Supposing that Start represents the match start position and Len represents the match end position. It can be understood by those skilled in the art that the match start position and the match end position corresponding to each matching rule which are recorded in a corresponding matching unit may be as follows:

A-Start=1;

A-Len=A-depth+A-offset−the number of characters having been detected in all segments; where A-depth represents a detection length of matching rule A, e.g. 50 in this embodiment; A-offset represents the offset of matching rule A, e.g. 3 in this embodiment;

B-Start=full match position of matching rule A+length of match object in matching rule A+B-distance; where B-distance represents the offset of matching rule B; when matching rule A is to match "abc", the length of match object in matching rule A is 3.

B-Len=B-Start+B-within; where B-within represents a detection length of matching rule B.

C-Len=C-Start+C-within; where C-distance represents the offset of matching rule C and C-within represents a detection length of matching rule C.

Figure 5A:
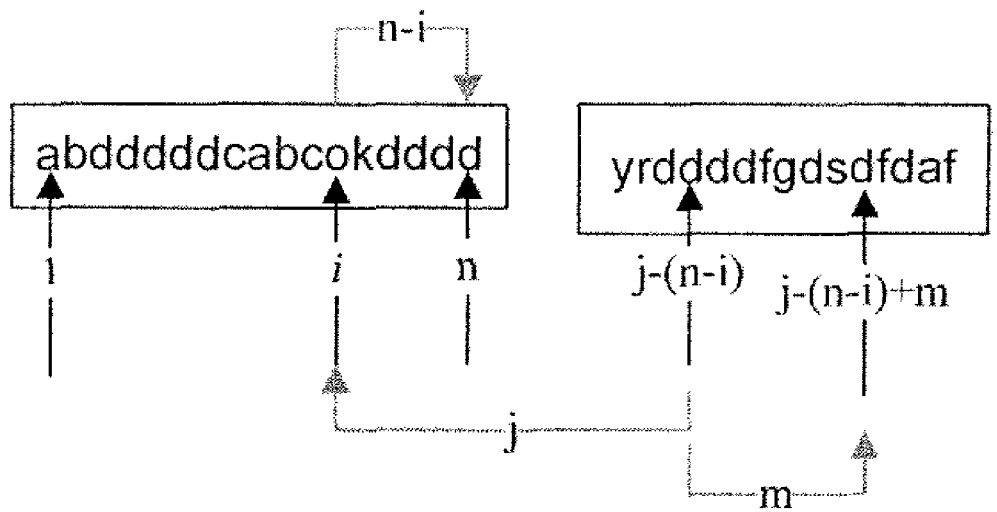
FIG. 5A is a schematic diagram illustrating calculation of a match start position and a match end position when the length of a segment of a matching unit does not meet the requirement of effective detection range.
Figure 5B:
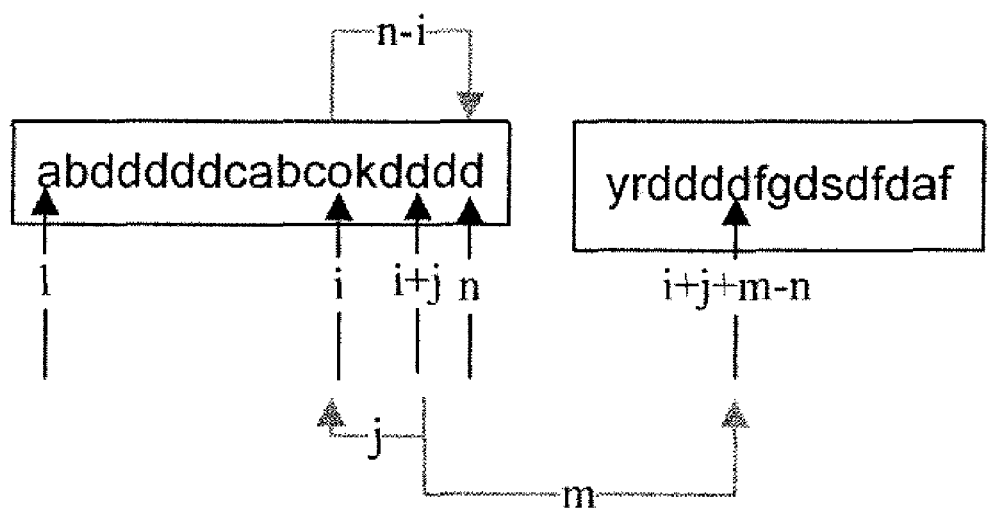
FIG. 5B is a schematic diagram illustrating calculation of a match start position and a match end position when the length of a segment of a matching unit meets the requirement of the effective detection range.

In the cross-packet case, it is relatively complicated. FIG. 5A is a schematic diagram illustrating calculation of a match start position and a match end position if the segment length of the matching unit cannot meet the requirement of effective detection range. FIG. 5B is a schematic diagram illustrating calculation of a match start position and a match end position if the segment length of the matching unit meets the requirement of the effective detection range. As shown in FIG. 5A and FIG. 5B, because the length of the match object is equal to the match start position plus the corresponding number of characters, the content length is supposed as 0 for purpose of convenience. Suppose n is the length of the current segment, i denotes the full match position of the previous matching rule in the current segment, j denotes the offset of the next matching rule, and m denotes the detection length of the next matching rule. In FIG. 5A, the match start position Start of the next matching rule is j−(n−i), the match end position Len of the next matching rule is Start+m. In FIG. 5B, the match start position Start of the next matching rule is i+j, and the match end position Len of the next matching rule is Start+m. In case that Start and Len are not in the same segment, the actual value of Len is Start+m−n.

In conclusion, the calculation of the match start position and the match end position of the next matching rule in case of cross-packet in this embodiment is as follows:

A-Start=1;

A-Len=A-depth+A-offset−the number of characters having been detected in all segments;

B-Start=full match position of A+length of match object in matching rule A+B-distance, if the segment length of the matching unit can meet the effective detection range of matching rule B; or B-Start=B-distance−(length of the current segment−match position of A−length of match object in matching rule A), if the segment length of the matching unit cannot meet the requirement of the effective detection range of matching rule B; in this case, the match start position B-Start of matching rule B is in the next segment;

B-Len=B-Start+B-within;

C-Start=full match position of B+length of match object in matching rule B+C-distance, if segment length of matching unit can meet the requirement of the effective detection range of matching rule C; or C-Start=C-distance−(length of current segment−match position of B-length of match object in matching rule B), if the segment length of the matching unit cannot meet the requirement of the effective detection range of matching rule C; in this case, the match start position C-Start is in the next segment;

C-Len=C-Start+C-within.

With respect to the transmission flow shown in FIG. 3, the match start position is "1" and the match end position is "53" when the matching unit is created. After the pattern matching of segment 1 and the storage of postfix "a", the match start position and match end position of the matching unit need to be adjusted. Specifically, the match start position is "1", representing the pattern matching for the next segment starts from the first character of the next segment. As to the match end position, as shown in FIG. 3, the pattern matching for segment 1 starts from the position with offset 3, i.e. offset characters are 3, and the characters for which the pattern matching is performed are "ddddca". Because character "a" is stored for the next matching, characters actually having been checked are "ddddc", five characters all together. Thus, the match end position is: original match end position−offset−the number of characters having been checked, i.e. 53−3−5=45. Therefore, the match end position is modified from "53" to "45".

After the modification of the match start position and the match end position, the pattern matching corresponding to the current matching unit is finished.

In addition, in order to avoid storing redundant information and improve matching efficiency, whether the modified match start position or the modified match end position exceeds the effective detection range is determined after the modification of the match start position and the match end position in this Block. If the modified match start position or the modified match end position exceeds the effective detection range, the matching unit is deleted; otherwise, Block 411 is performed. For example, if the modified match start position is 0, it indicated that it is impossible to perform the pattern matching for the next segment. Therefore, the matching unit is deleted. Certainly, instead of deleting the matching unit, deleting the contents of the matching unit or adding an identifier to indicate that the matching unit would not be used for pattern matching any more may be performed. The operations of deleting the matching unit, deleting the contents and adding the identifier are to release the flow status information in the matching unit. If the latter two manners are adopted, the matching unit still exists, which is propitious for keeping the continuation of the matching units if the matching units are numbered sequentially.

In this embodiment, all the flow status information of the transmission flow under the current pattern may be deleted when the transmission flow is finished or when the match start positions or match end positions of all the matching units of the transmission flow under the current pattern exceed the effective detection range. Compared with the detection of all transmission flows, the detection of the match start position or the match end position is more sensitive, thus is propitious for deleting the flow status information in time, releasing the space and simplifying pattern matching operations.

Blocks 411-412: Whether there is a matching unit not having been used for matching is determined; if there is a matching unit not having been used for matching, Block 404 is performed; otherwise, the pattern matching of the current segment is terminated.

If the pattern matching has been performed according to all the matching units, the pattern matching of the current segment is finished.

Thus, the pattern matching in this embodiment is finished.

It can be seen from the above embodiment that the postfix of the previous segment is stored as the pre-stored character in the flow status information under the current matching pattern of the transmission flow. When performing pattern matching for any segment, the pre-stored character is combined with the current segment to form the target segment. Thus the flow-reassembly can be omitted, which effectively avoids series of defects caused by the flow-reassembly.

In this embodiment, if a matching rule is fully matched, a new matching unit is created. The match start position and the match end position in the matching unit are updated if the matching result is partial match. Thus, false negative can be effectively avoided, especially when the transmission flow accords with the matching rule at multiple positions.

The following describes a procedure of applying the pattern matching in the above embodiment to the transmission flow shown in FIG. 3, includes the following steps.

111: Segment 1 is received.

112: It is determined that there is no flow status information corresponding to current matching pattern for the transmission flow to which segment 1 belongs. Thus, flow status information is created for the transmission flow under the current matching pattern. The creation includes: configuring a first matching unit A where match start position "1" and match end position "53" of matching rule A are recorded; configuring a designated unit to record the pre-stored character, i.e. configuring a special Byte Pkt which is null at the beginning and taking segment 1 as the target segment.

113: The pattern matching is performed for the target segment according to matching unit A, i.e. searching for "abc" in segment 1 from offset 3. The matching result is partial match. But the final character of segment 1 is "a" which may be combined with segment 2 to form the match object "abc". Therefore, it is necessary to store character "a" in Pkt and record a relative position as 1.

114: The match start position and the match end position in matching unit A are modified according to the length of segment 1. Specifically, the match start position is modified to be "1" which means that the pattern matching of the next segment starts from the first character of the next segment; the match end position is modified to "45", i.e. original match end position 53 minus offset 3 of matching rule A as well as the number of characters having been detected 5.

115: It is determined that there is no other matching unit. As such, the pattern matching of segment 1 is finished.

116: Segment 2 is received.

117: It is determined that there is flow status information corresponding to the current matching pattern for the transmission flow to which segment 2 belongs. Thus, the character "a" stored in Pkt is combined with the contents of segment 2. Pkt is cleared and the combined segment "abcokabcddrtdef" is taken as the target segment.

118: The pattern matching is performed for the target segment according to the existing matching unit A, i.e. searching for the match object "abc" in the target segment from the first character. The matching result is full match.

119: Matching unit B1 is created for matching rule B in the flow status information. The creation includes: recording rule information, match start position 1+3+4=8 and match end position 8+10=18 for matching rule B of the current pattern, where the match end position represents that the pattern matching of matching unit B1 is performed for characters before the 18th character in the target segment.

120: The pattern matching is performed for the target segment after the position of the full match again according to the match object "abc" of matching rule A, i.e. from the 4$^{th}$ character of the target segment. The matching result is full match.

121: Matching unit B2 is created for matching rule B in the flow status information. The creation includes: recording rule information, match start position 6+3+4=13 and match end position 13+10=23 of matching rule B in the current pattern.

122: After the position of the full match, i.e. from the 9$^{th}$ character in the target segment, the pattern matching is performed for the target segment again according to the match object "abc" of matching rule A. The matching result is mismatch.

123: The match start position and the match end position in matching unit A are modified according to the length information of the target segment. Specifically, the match start position is modified to be "1" which means performing the pattern matching from the first character of the next segment; and the match end position is modified to be "30", i.e. previous match end position 45 minus the number of characters having been detected 15. Thus, the pattern matching according to matching unit A is finished.

124: Because there are currently two new matching units B1 and B2, either is selected randomly to perform the pattern matching for the target segment. It is supposed that the pattern matching according to matching unit B1 "def" is firstly performed for characters 8 to 18 of the target segment. Because the length of the target segment is 15, the matching operation is actually performed from character 8 to the end of the target segment. The matching result is full match. Certainly, an order for selecting the matching unit may be configured in advance according to, for example, an order that the matching units are created.

125: Matching unit C1 is created corresponding to matching rule C in the flow status information. The creation includes recording rule information, match start position 3−(15−13−3)=4 and match end position 4+8=12 of matching rule C.

126: Because there is no character in the target segment after the position fully matched with matching rule B, the matching of matching rule B at the second time is unsuccessful.

127: According to the length 15 of the target segment, the match start position in matching unit B1 is modified to be 1 representing that the matching for the next segment starts from the first character of the next segment. The match end position of matching unit B1 is modified to be 18−15=3. At this time, the pattern matching according to matching unit B1 is finished.

128: The pattern matching is performed for the target segment according to the next matching unit B2, i.e. searching for "def" in the target segment between characters 13 to 23. Because the length of the target segment is 15, the pattern matching is actually performed from character 13 to the end of the target segment. The matching result is full match.

129: Matching unit C2 is created which also corresponds to matching rule C in the flow status information. The creation includes: recording rule information, match start position 3−(15−13)=4 and match end position 4+8=12 of matching rule C.

130: The match start position and the match end position in matching unit B2 are modified according to the length 15 of the target segment. Specifically, the match start position of matching unit B2 is modified to be 1 representing that the matching of the next segment starts from the first character. The match end position is modified to be 23−15=8. At this time, the pattern matching according to matching unit B2 is finished.

Because there is no other matching units corresponding to the target segment, the pattern matching for segment 2 is finished.

131: Segment 3 is received.

132: If it is determined that there is flow status information corresponding to the current matching pattern for the transmission flow to which segment 3 belongs, the contents stored in Pkt are combined with those of segment 3 to form a target segment. Because Pkt is null, the combined target segment is still segment 3.

133: The pattern matching is performed for the target segment according to matching unit A, i.e. searching for "abc" in segment 3 from the first character. The result is full match.

134: Matching unit B3 is created for matching rule B in the flow status information. The creation includes: recording rule information, match start position 4−(3−(1+3))=5 and match end position 5+10=15 of matching rule B.

135: The pattern matching according to matching unit A is performed for the target segment again. Because there is no character after the position of full match of matching rule A, the matching is unsuccessful.

136: The match start position and the match end position in matching unit A are modified according to the length of segment 3. Specifically, the match start position in matching unit A is modified to be 1 representing that the matching of the next segment starts from the first character. The match end position is modified to be 30−3=27. At this time, the pattern matching of segment 3 according to matching unit A is finished.

137: The pattern matching according to matching unit B1 is performed for the target segment, i.e. searching for "def" in the target segment from the first character. The result is mismatch.

138: The match start position and the match end position in the matching unit B1 are modified according to the length of the target segment. Specifically, the match start position in matching unit B1 is modified to be 1 which represents that the matching of the next segment starts from the first character. The match end position is modified to be 3−3=0. At this time, the pattern matching of segment 3 according to matching unit B1 is finished.

139: Because the match end position of matching unit B1 exceeds an effective detection range, matching unit B1 is deleted.

140: The pattern matching is performed for the target segment according to the next matching unit B2, i.e. searching for "def" in the target segment between characters 1 to 8. Because segment 3 only has 3 characters, the pattern matching is actually performed from the first character to the end of segment 3. The result is mismatch.

141: The match start position and the match end position in matching unit B2 are modified according to the length of the target segment. Specifically, the match start position in matching unit B2 is modified to be 1 which represents that the matching of the next segment starts from the first character of the next segment. The match end position is modified to be 8−3=5. At this time, the pattern matching for segment 3 according to matching unit B2 is finished.

142: The pattern matching is performed for the target segment according to matching unit C1. Because the match start position of matching unit C1 exceeds the range of segment 3, the result is mismatch.

143: The match start position and the match end position in matching unit C1 are modified according to the length of the target segment. Specifically, the match start position in matching unit C1 is modified to be 4−3=1 which represents that the matching of the next segment starts from the first character of the next segment. The match end position is modified to be 12−3=9. At this time, the pattern matching of segment 3 according to matching unit C1 is finished.

144: The pattern matching is performed for the target segment according to matching unit C2. Because the match start position exceeds the range of segment 3, the result is mismatch.

145: The match start position and the match end position in the matching unit C2 are modified according to the length of the target segment. Specifically, the match start position in matching unit C2 is modified to be 4−3=1 which represents that the matching of the next segment starts from the first character of the next segment. The match end position is modified to be 12−3=9. At this time, the pattern matching for the target segment, segment 3, according to matching unit C2 is finished.

Because there is no other matching unit according to which pattern matching is not performed, the pattern matching for segment 3 is finished.

146: Segment 4 "dddefdfdkdefkad" is received.

147: If it is determined that there is the flow status information corresponding to the current matching pattern for the transmission flow to which segment 4 belongs, the contents stored in Pkt are combined with those of segment 4 to form a target segment. Because Pkt is null, the target segment is still segment 4.

148: The pattern matching is performed for the target segment according to matching unit A, i.e. searching for "abc" in the target segment from the first character of the target segment. The result is mismatch.

149: The match start position and the match end position in matching unit A are modified according to the length of the target segment. Specifically, the match start position is modified to be "1" which represents that the matching of the next segment starts from the first character of the next segment. The match end position is modified to be 27−15=12, i.e. the previous match end position minus the number of characters having been detected 15. At this time, the pattern matching for segment 4 according to matching unit A is finished.

150: The pattern matching is performed for the target segment according to the next matching unit B2, i.e. searching for "def" in the target segment between characters 1 to 5. Because the matching is finished before the fifth character, only the fourth character "e" is matched. The result is mismatch.

151: The match start position and the match end position in matching unit B2 are modified according to the length of segment 4. The modified match start position and the modified match end position in matching unit B2 are negatives. Thus, the pattern matching for segment 4 according to matching unit B2 is finished.

152: Because the modified match start position and the modified match end position in matching unit B2 are negatives which exceed the effective detection range, matching unit B2 is deleted.

153: The pattern matching is performed for the target segment according to the next matching unit B3, i.e. searching for "def" in the target segment between the 5th to the 15th character. The result is full match.

154: Matching unit C3 corresponding to matching rule C is created in the flow status information. The creation includes: recording rule information, match start position 3−(15−10−3)=1 and match end position 1+8=9 of matching rule C.

155: The pattern matching according to matching rule B is performed again for the characters after the position of the full match of matching rule B in segment 4, i.e. from the 12th character. Because it exceeds the range of matching unit B3, the result is mismatch.

156: The match start position and the match end position in matching unit B3 are modified according to the length of segment 4. The modified match start position and the modified match end position are negatives. At this time, the pattern matching for segment 4 according to matching unit B3 is finished.

157: The match start position and the match end position of matching unit B3 are respectively −10 and 0 which exceed the effective detection range, and matching unit B3 is thus deleted.

158: The pattern matching is performed for the target segment according to the next matching unit C1. Between the first to the ninth character, no characters are matched with string "ghk".

159: The match start position and the match end position in matching unit C1 are modified according to the length of segment 4. The modified match start position and the modified match end position in matching unit C1 are negatives. At this time, the pattern matching for segment 4 according to matching unit C1 is finished.

160: The match start position and the match end position of matching unit C1 exceed the effective detection range, and matching unit C1 is thus deleted.

161: The pattern matching is performed for the target segment according to the next matching unit C2. Between the first to the ninth character, no characters are matched with string "ghk".

162: The match start position and the match end position in matching unit C2 are modified according to the length of segment 4. The modified match start position and the modified match end position are negatives. At this time, the pattern matching for segment 4 according to matching unit C2 is finished.

163: Because the modified match start position and the modified match end position of matching unit C2 exceed the effective detection range, matching unit C2 is deleted.

It can be seen from the match start position of the next matching unit C3 that matching unit C3 corresponds to a next segment. Therefore, the pattern matching of segment 4 is finished.

164: Segment 5 "ghkdef" is received.

165: If it is determined that there is flow status information corresponding to the current matching pattern for the transmission flow to which segment 5 belongs, the contents of Pkt are combined with those of segment 5 to form a target segment. Because Pkt is null, the target segment is still segment 5.

166: The pattern matching is performed for the target segment according to matching unit A, i.e. searching for "abc" in the target segment between the first to the fifth character. The result is mismatch.

167: The match start position and the match end position in matching unit A are modified according to the length of segment 5. Specifically, the match start position is modified to be "1" which represents that the matching of the next segment starts from the first character of the next segment. The match end position is modified to be 12−6=6, i.e. previous match end position minus the number of characters having been detected 6. At this time, the pattern matching for segment 5 according to matching unit A is finished.

168: The pattern matching is performed for the target segment according to the next matching unit C3, i.e. searching for "ghk" in the target segment between the first and the ninth character. The result is full match.

169: The matching according to matching unit C3 is finished. A matching success command is returned.

170: The flow status information of the current matching pattern is deleted, i.e. all the matching units are deleted. The pattern matching for the current transmission flow is finished.

In the above procedure including 111 to 170, matching units C1, C2 and C3 are obviously corresponding to the final rule in the current matching pattern. In this case, "ghk" is searched for in the contents with length 8 from offset 3 of the position where matching rule B is fully matched, after the match of matching unit C3 is finished, the current flow status information is released. In case that the matching according to the final matching unit C3 does not succeed, all the matching units can also be deleted when the current transmission flow is finished, or when the match start position or the match end positions of all the matching units exceed the effective detection range.

In the above embodiment, the matching units are deleted respectively. Alternatively, it is also possible to delete the contents recorded in the matching units or to add an identifier to the matching unit to be deleted to identify that the pattern matching is not performed according to the matching unit any more, which effectively avoids repeated operations. Although the latter two manners may occupy a certain amount of memory, they are propitious for ensuring the continuity of the matching units.

Embodiment 2

This embodiment is also for the single-pattern matching and taking the BF algorithm as an example. The flow status information includes postfix information of the previous segment, match start position and match end position of a first matching rule. The difference between this embodiment and the embodiment 1 is that the postfix of the previous segment in this embodiment is considered after the matching unit in the flow status information is obtained, and that the postfix of the previous segment is stored in the current matching unit as a pre-stored character, i.e. the designated unit storing the pre-stored character changes dynamically.

Figure 6:
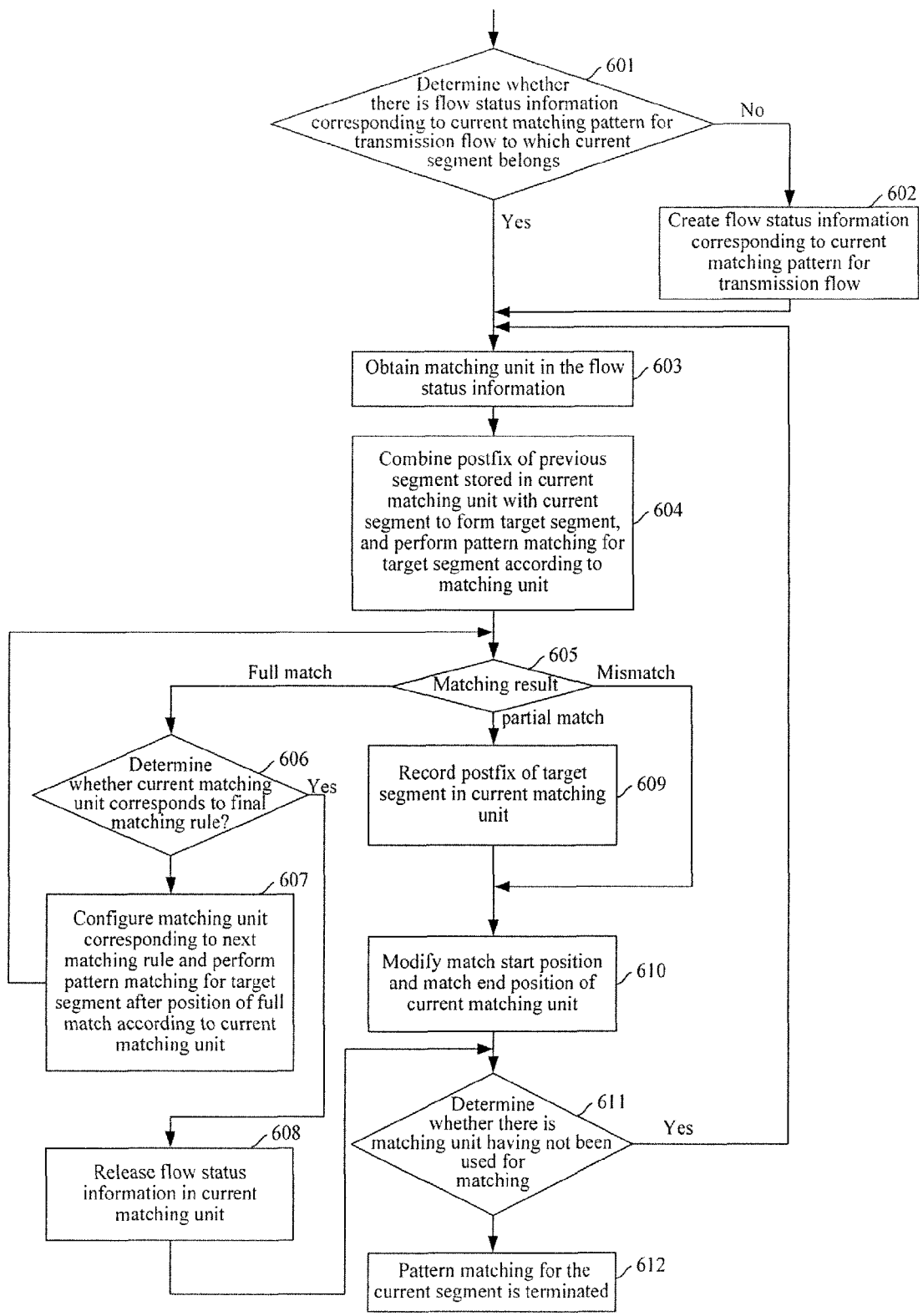
FIG. 6 is a flowchart illustrating a method of pattern matching according to embodiment 2.

FIG. 6 is a flowchart illustrating a method of pattern matching according to embodiment 2 of the present invention. As shown in FIG. 6, the method includes:

Block 601: Whether there is flow status information corresponding to the current matching pattern for the transmission flow to which the current segment belongs is determined. If there is the flow status information corresponding to the current matching pattern for the transmission flow to which the current segment belongs, Block 603 is performed; otherwise, Block 602 is performed.

Block 602: The flow status information is created corresponding to the current matching pattern for the transmission flow, and the current segment is taken as the target segment and Block 603 is performed.

The flow status information in this Block is created in the same manner as that in Block 403. Specifically, the creation of the flow status information corresponding to the current matching pattern mainly includes the following operations: 1) creating a first matching unit, and recording rule information, match start position and match end position of the first matching rule; 2) configuring a designated unit for recording the pre-stored character, and clearing the space allocated to the pre-stored character in the designated unit, where the pre-stored character is the postfix of the previous segment.

In this embodiment, the designated unit for recording the pre-stored character is configured to be the current matching unit obtained in the following Blocks, i.e. the designated unit changes dynamically. Similar to embodiment 1, however, the space preserved for the pre-stored character can also be configured according to the maximum one of the length of the match objects of all the matching rules.

Block 603: One matching unit in the flow status information is obtained and is taken as the current matching unit.

In this Block, the matching unit may be obtained according to an order of the matching units in the flow status information, or be obtained randomly. If it is the first time to process the segment immediately after the flow status information is created, there is only one matching unit in the flow status information. Thus, only this matching unit, i.e. the first matching unit, can be obtained.

Block 604: The postfix of the previous segment stored in the current matching unit is combined with the current segment to form the target segment. The postfix of the previous segment in the current matching unit is deleted and the pattern matching is performed for the target segment according to the matching unit.

Because the postfix of the previous segment, as the pre-stored character, is stored in the current matching unit, during the combination in this Block, the postfix of the previous segment is obtained from the current matching unit, and the contents of the current segment are arranged behind the postfix of the previous segment to form the target segment which is the object of the subsequent pattern matching. In addition, after the combination is finished, the postfix of the previous segment is not useful any more. Therefore, the space corresponding to the postfix is cleared.

If there is no character which may meet the matching rule after being combined with the current segment, the postfix of the previous segment need not be saved. At this time, the postfix of the previous segment may also be regarded as null. Thus, before performing the combination in this Block, whether the postfix of the previous segment is null may be determined. If the postfix of the previous segment is null, the current segment is taken as the target segment; otherwise, the combination operation of this Block is performed.

Block 605: If it is determined that the matching result is full match, Block 606 is determined; if the matching result is partial match, Block 609 is performed; if the matching result is mismatch, Block 610 is performed.

Similar to embodiment 1, the pattern matching in this embodiment is also performed according to the rule information, match start position and match end position which are recorded in the matching unit. If the target segment includes all the match objects in the matching rule, it is determined that the matching result is full match; if the target segment includes at least one character consistent with part of the match objects in the rule information, it is determined that the matching result is partial match; if the target segment does not include character consistent with the match objects in the rule information, it is determined that the matching result is mismatch.

Blocks 606-608: Whether the current matching unit corresponds to the final matching rule is determined. If the current matching unit corresponds to the final matching rule, the flow status information in the current matching unit is released and Block 611 is performed; otherwise, a matching unit corresponding to the next matching rule is configured and the pattern matching is performed for the part of the target segment after the position of full match according to the current matching unit, and Block 605 is performed again.

Block 609: The postfix of the target segment is recorded in the current matching unit.

If it is determined in Block 605 that the matching result is partial match, the postfix of the target segment which may accord with the matching rule after combined with the next segment is recorded, where the postfix is recorded in the designated unit configured in Block 603. The designated unit is the current matching unit in this embodiment.

Because the pattern matching is performed for each segment respectively, the pre-stored character which changes dynamically can ensure that information in the matching unit will not be lost.

Block 610: The match start position and the match end position of the current matching unit are modified according to the length of the target segment.

The modification of the match start position and the match end position in this Block is similar to that in Block 410 of embodiment 1. After finishing the modification of the match start position and the match end position, the pattern matching according to the current matching unit is finished.

In this Block, after the match start position and the match end position are modified, whether the modified match start position or the modified match end position exceeds the effective detection range may be determined. If the modified match start position or modified match end position exceeds the effective detection range, the current matching unit is deleted; otherwise, Block 611 is performed. Thus, the storage of redundant information can be avoided and efficiency of the pattern matching can be increased.

In this Block, the flow status information of the current pattern may be deleted when the transmission flow is terminated, or when the match start positions or the match end positions of all the matching units of the current pattern exceed the effective detection range. Compared with the detection of the whole transmission flow, the detection of the match start position or the match end position is more sensitive which is propitious for deleting the flow status information in time, releasing the space and simplifying the matching operations.

Blocks 611-612: Whether there is a matching unit having not been matched is determined. If there is a matching unit having not been matched, Block 603 is performed; otherwise, the pattern matching for the current segment is terminated.

If the pattern matching has been performed according to all the matching units, the pattern matching for the current segment is finished.

Thus, the procedure of the pattern matching in this embodiment is finished.

Embodiment 3

This embodiment is also for the single-pattern matching and taking the BF matching algorithm as an example. The flow status information includes the postfix information of the previous segment, match start position and match end position of a first matching rule. In this embodiment, the flow status information is organized in the manner of a status tree, i.e. each node in the status tree records one matching unit. Further, according to the order of the matching rules, a node where the matching unit of a next matching rule is located is a sub-node of a node where the matching unit of a matching rule previous to the next matching rule is located. The inherit relationship of the status tree is definite, which is propitious for the identifying and processing during the pattern matching.

In this embodiment, when a segment is received, the segment is taken as the current segment, and whether there is a status tree corresponding to the current pattern for the transmission flow to which the current segment belongs is determined. If there is a status tree corresponding to the current pattern for the transmission flow to which the current segment belongs, the current segment is combined with the postfix of the previous segment which is saved in the root node of the status tree to form a target segment. The postfix of the previous segment in the root node is deleted and the pattern matching is performed for the target segment according to the status tree. If there is no status tree corresponding to the current pattern for the transmission flow to which the current segment belongs, a status tree corresponding to the current pattern is created for the transmission flow to which the current segment belongs, the current segment is taken as the target segment and the pattern matching is performed for the target segment according to the status tree.

In this embodiment, the pattern matching for the target segment mainly includes performing width traverse of the status tree for the target segment and performing the pattern matching for the target segment according to each node which is a matching unit in the status tree respectively.

Figure 7:
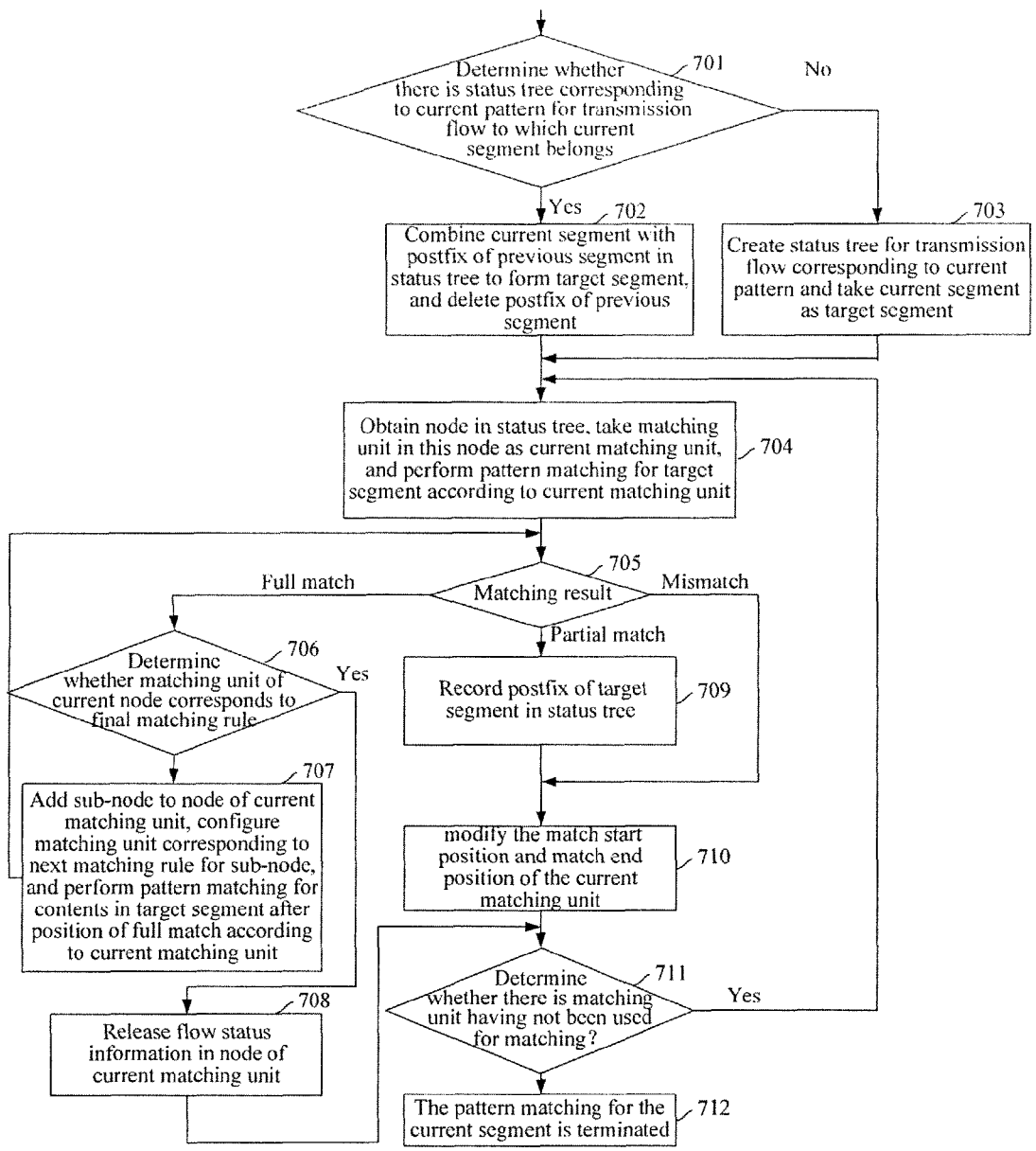
FIG. 7 is a flowchart illustrating a method of pattern matching according to embodiment 3 of the present invention.

FIG. 7 is a flowchart illustrating a method of pattern matching according to embodiment 3 of the present invention. As shown in FIG. 7, the method includes:

Block 701: Whether there is a status tree corresponding to the current pattern for the transmission flow to which the current segment belongs is determined. If there is a status tree corresponding to the current pattern for the transmission flow to which the current segment belongs, Block 702 is performed; otherwise, Block 703 is performed.

Block 702: The current segment is combined with the postfix of the previous segment in the status tree to form a target segment, and Block 704 is performed.

In this embodiment, in order to facilitate finding the postfix of the previous segment in the flow status information, the postfix of the previous segment may be taken as a pre-stored character and stored in a designated node of the status tree. Thus, the postfix of the previous segment stored as the pre-stored character can be read from the matching unit in the designated node. The contents of the current segment are arranged behind the character read from the matching unit to form a target segment which is the object of the pattern matching in the subsequent Blocks. In addition, after the target segment is formed, the pre-stored character of the matching unit in the designated node may be cleared so that the designated node can be used subsequently.

Block 703: A status tree for the transmission flow corresponding to the current pattern is created and the current segment is taken as a target segment.

The creation of the status tree for the transmission flow to which the current segment belongs under the current pattern mainly includes the following operations: 1) creating a root node, recording a first matching unit, and recording rule information, match start position and match end position of a first matching rule in the first matching unit; 2) configuring a designated unit for recording a pre-stored character and clearing the space allocated to the pre-stored character in the designated unit, where the pre-stored character is the postfix of the previous segment.

Block 704: One node in the status tree is obtained, and the matching unit in this node is taken as the current matching unit. The pattern matching is performed for the target segment according to the current matching unit.

In this Block, the node may be obtained according to an inherit relationship of the status tree. In other words, if it is the first time to perform the pattern matching after the status tree is created, there is only the root node in the status tree, and then only the root node can be obtained in the Block; if there are more than one node in the status tree, the node which has not been used for pattern matching of the current segment is obtained according to the inherit relationship of the status tree. For example, the nodes correspond to matching rule A and matching rule B in the status tree both have been obtained for the pattern matching of the current segment, then a node corresponding to matching rule C may be obtained in this Block.

Block 705: If it is determined that the matching result is full match, Block 706 is performed; if the matching result is partial match, Block 709 is performed; if the matching result is mismatch, Block 710 is performed.

The pattern matching is performed according to the rule information, match start position and match end position recorded in the matching unit of the node obtained. If the target segment includes all the match objects in the rule information, it is determined that the matching result is full match; if the target segment includes at least one character which is consistent with part of the match objects in the rule information, it is determined that the matching result is partial match; if the target segment has no character consistent with the match objects in the rule information, it is determined that the matching result is mismatch.

Blocks 706-708: It is determined whether the matching unit in the current node corresponds to the final matching rule. If the matching unit in the current node corresponds to the final matching rule, the flow status information in the node of the current matching unit is released and Block 711 is performed; otherwise, a sub-node to the node of the current matching unit is added, a matching unit corresponding to the next matching rule is configured for the added sub-node, the pattern matching is performed for the contents in the target segment after the position of full match according to the current matching unit, and then Block 705 is performed again.

Block 709: The postfix of the target segment is recorded in the status tree.

If the matching result determined in Block 705 is partial match, the postfix of the target segment is recorded which may be combined with the next segment to form a target segment meeting the matching rule, where the postfix is recorded in the designated unit of the designated node configured in Block 703.

In order to ensure that the information in any matching unit is not lost, whether another postfix has been recorded in the designated node is checked before recording a postfix. If another postfix has been recorded in the designated node, the postfix to be recorded is compared with the postfix having been recorded, and the postfix which has more characters is saved; otherwise, the postfix to be recorded is saved. Alternatively, the postfix to be recorded is saved in a separate byte area, a pointer to the byte area is saved in the root node, and a relative position of the postfix is recorded in the current matching unit.

Block 710: The match start position and match end position of the current matching unit are modified according to the length of the target segment.

The modification in this Block may be performed in a similar way to that in Block 410 of embodiment 1.

In this Block, after the match start position and the match end position are modified, whether the modified match start position or the modified match end position exceeds the effective detection range may be determined. If the modified match start position or the modified match end position exceeds the effective detection range, whether the sub-node of the node where the current matching unit is located is null is determined. If the sub-node is null, the node where the current matching unit is located is deleted; if the sub-node is not null, the node where the current matching unit is located is identified as "not be used for pattern matching any more", or the content recorded in the node where the current matching unit is located is deleted. If the modified match start position or the modified match end position does not exceed the effective detection range, Block 711 is performed. Thus, the storage of redundant information can be avoided and efficiency of the pattern matching can be increased.

Furthermore, in order to reduce the cost of resources, after the node where the current matching unit is located is deleted, it may be determined whether a parent node of the node where the current matching unit is located is identified as "not be used for pattern matching any more" or whether the parent node has no contents; if yes, the parent node of the node where the current matching unit is located is deleted.

In addition, the status tree of the current pattern may be deleted when the matching of the current pattern succeeds, or when the transmission flow is finished, or when the match start positions or the match end positions in all the nodes of the current pattern exceed the effective detection range.

After the modification of the match start position and the match end position, the pattern matching corresponding to the current matching unit is finished.

Blocks 711-712: Whether there is a matching unit having not been used for the pattern matching is determined. If there is a matching unit having not been used for pattern matching, Block 704 is performed again; otherwise, the pattern matching for the current segment is terminated.

If the pattern matching has been performed according to all the matching units, the pattern matching for the current segment is finished.

Thus, the pattern matching in this embodiment is finished.

It can be seen from the above Blocks that, when performing pattern matching for any segment in this embodiment, the pre-stored character is combined with the current segment to form the target segment, which does not need the flow-reassembly, thereby effectively avoiding series of defects caused by the flow-reassembly.

Figure 8:
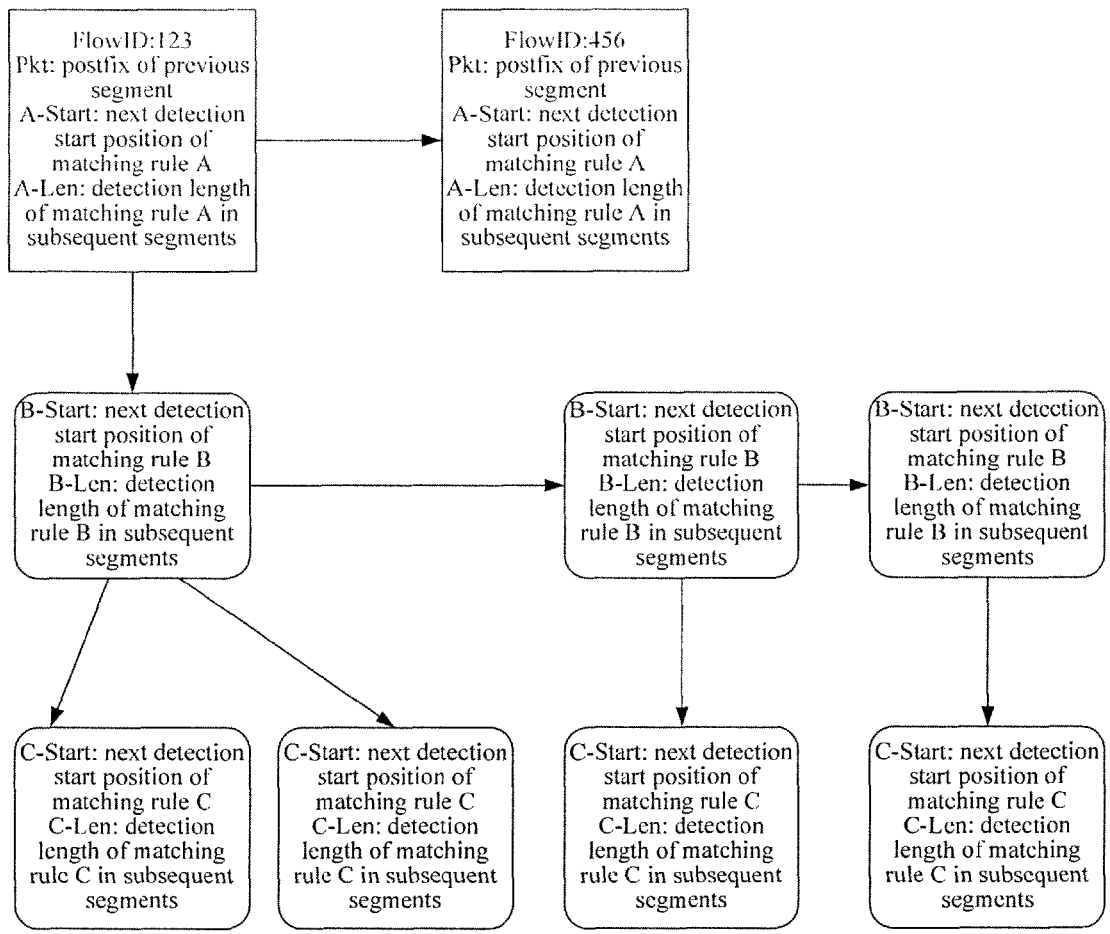
FIG. 8 is a schematic diagram illustrating a status tree in embodiment 3 in which two transmission flows are taken as an example.

FIG. 8 is a schematic diagram illustrating a status tree in embodiment 3 in which two transmission flows are taken as example. As shown in FIG. 8, the transmission flows are differentiated by flow identifiers (IDs). In FIG. 8, for the transmission flow with the ID 123, the status tree according to this embodiment is illustrated, while for the transmission flow with the ID 456, only the root node is illustrated. As can be seen from FIG. 8, by the solution of pattern matching according to this embodiment, no disturbance occurs between different transmission flows or between different patterns. With respect to the status tree according to this embodiment, no disturbance refers that different trees are independent of each other.

Further, the match start position and match end position are recorded in the matching unit in each node in FIG. 8, and the matching rule information of the matching unit is also recorded. When performing the width traverse for any segment, the matching using matching rule A is performed according to the root node, the matching using matching rule B is performed according to the second-level node, and the matching using the matching rule C is performed according to the third-level node. Hereinafter, the segments shown in FIG. 3 are taken as an example, and the pattern matching in this embodiment is explained with reference to the dynamic changing figures of the status trees shown in FIG. 9A to FIG. 9I respectively.

Figure 9A:
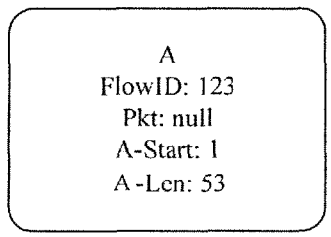
FIG. 9A to FIG. 9I show dynamic changes of the status tree in embodiment 3.

As shown in FIG. 9A, when segment 1 shown in FIG. 3 is received and it is determined that there is no status tree corresponding to the current pattern for the transmission flow to which segment 1 belongs, a status tree corresponding to the current pattern is created for the transmission flow. The creation includes: configuring a root node where match start position "1" and match end position "53" of matching rule A "abc" are recorded. The creation further includes: configuring a designated unit for recording a pre-stored character and taking segment 1 as the target segment. Specifically, the designated unit is a byte Pkt configured in the root node in this embodiment, where the Pkt is null at this moment.

Figure 9B:
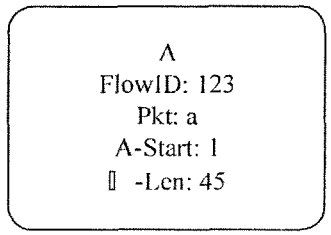

As shown in FIG. 9B, the width traverse is performed for the target segment. Specifically, the pattern matching is performed for the target segment according to the root node in the status tree, i.e. searching for string "abc" in segment 1 from offset 3 in segment 1. The result is partial match, but the last character of segment 1 is "a" which may be combined with the next segment to form the target string "abc". Therefore, the postfix of segment 1 is character "a", which is saved in the Pkt; and the relative position 1 is recorded. The match start position and the match end position in the root node are modified according to the length of segment 1, i.e. modifying the match start position to be "1" which represents that the matching of the next segment starts from the first character, and modifying the match end position to be "45" equal to the previous match end position "53" minus offset 3 as well as the number of characters having been detected 5. At this time, the pattern matching of segment 1 is finished.

Figure 9C:
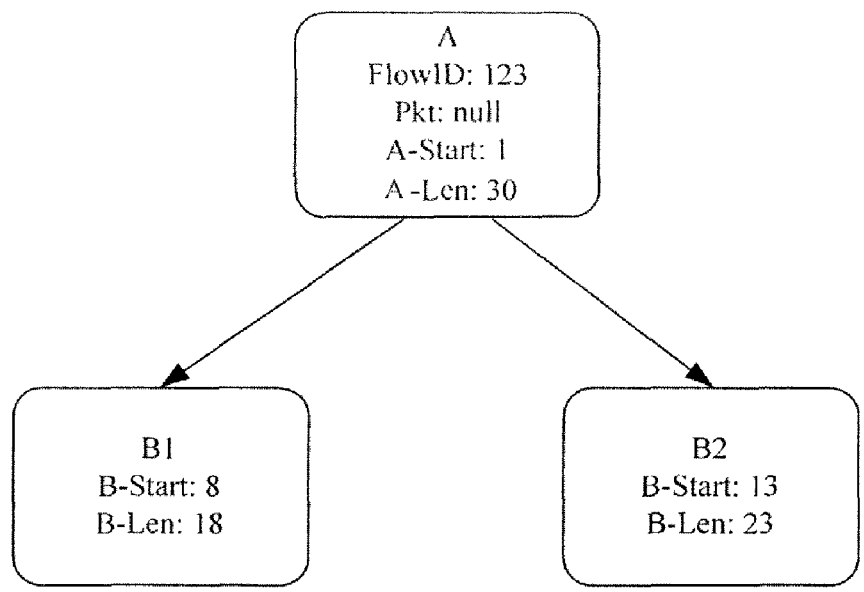

As shown in FIG. 9C, segment 2 is received and the width traverse is performed for segment 2. Firstly, it is determined that there is already the status tree corresponding to the current pattern for the transmission flow to which segment 2 belongs. The content "a" stored in the Pkt is taken as a prefix of the contents of segment 2 to form a target segment "abcokabcddrtdef" and the Pkt is cleared. The pattern matching is performed for the target segment, including the following process:

searching for string "abc" in target segment 2 from the first character of the target segment 2, where the result is full match; adding a sub-node B1 for the root node in the status tree, which includes recording rule information of matching rule B, match start position 1+3+4=8 and match end position 8+10=18 of matching rule B; searching for string "abc" in the target segment from the position of full match again, i.e. from the fourth character, where the result is full match; and therefore, adding another sub-node B2 for the root node in the status tree, which includes recording rule information of matching rule B, match start position 6+3+4=13 and match end position 13+10=23 of matching rule B; modifying the match start position and the match end position in matching unit A according to the length of the target segment. Specifically, modifying the match start position and the match end position in matching unit A is: modifying the match start position to be "1" which represents that the matching of the next segment starts from the first character, modifying the match end position to be 45−15=30. At this time, the matching of matching unit A is finished, i.e. the width traverse of the node in the first row is finished.

Figure 9D:
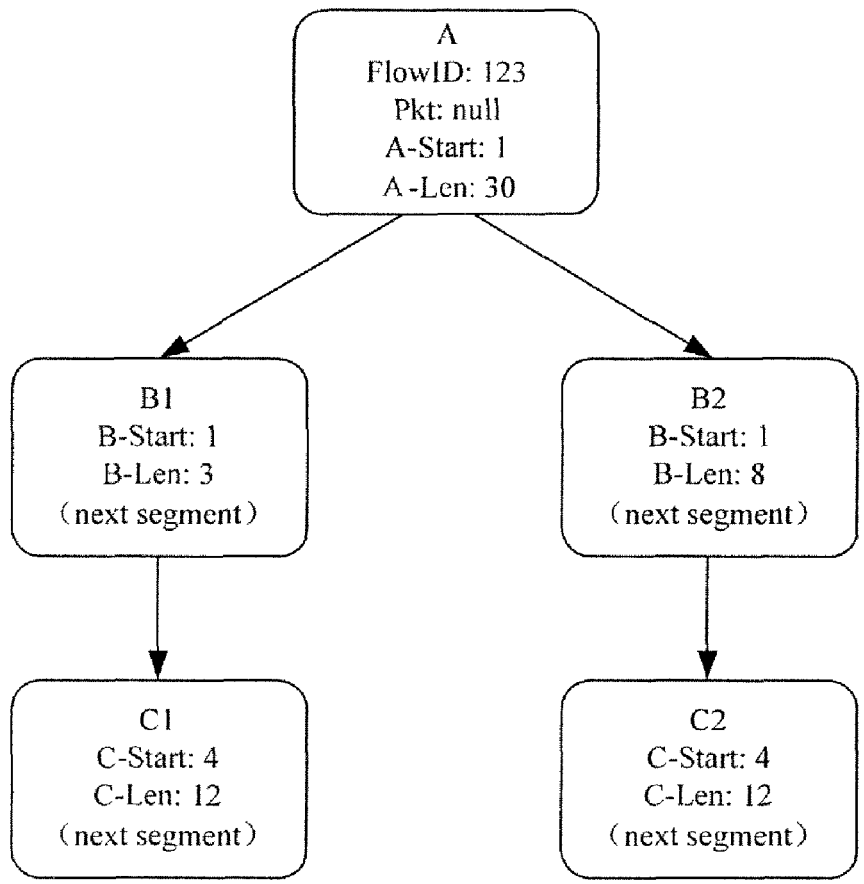

As shown in FIG. 9D, because there are two new matching unit nodes B1 and B2, the traverse need be performed for the nodes in the second row, and after the traverse, new sub-node C1 is added under the matching unit node B1 and a new sub-node C2 is added under the matching unit node B2. At the same time, the match start position and the match end position of B1 and that of B2 are changed respectively. The pattern matching for segment 2 is finished.

Figure 9E:
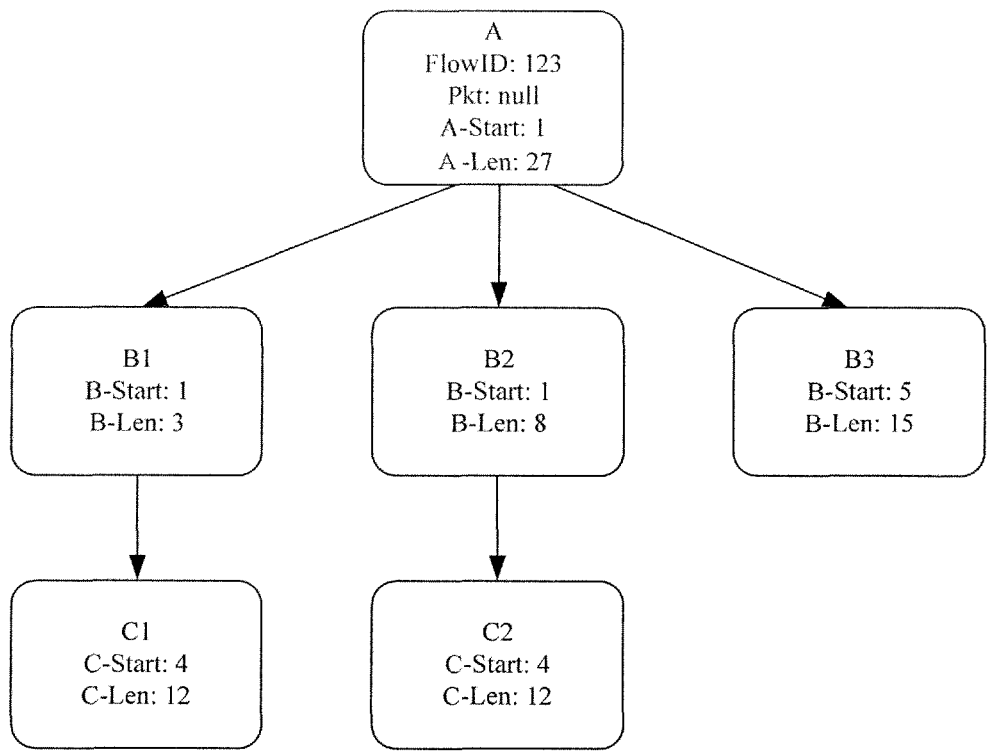

As shown in FIG. 9E, segment 3 is received and the width traverse is performed. During the traverse for the root node, a new matching unit node B3 is added, and the match start position and match end position of the root node are adjusted.

Figure 9F:
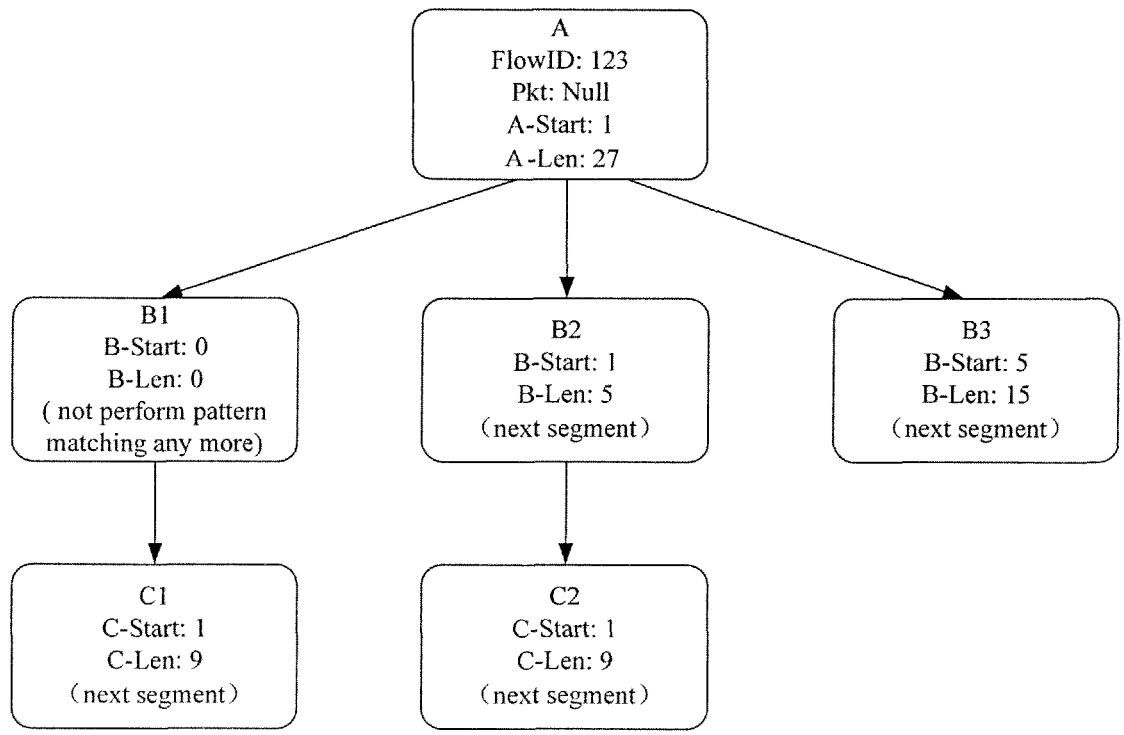

As shown in FIG. 9F, during the traverse for the second-level matching unit nodes, no new sub-node is created, and the match start position and the match end position of the previous matching unit node B1 and those of the previous matching unit node B2 are changed, where B1 is identified to be "not be used for pattern matching any more" because the match end position of matching unit B1 exceeds the effective detection range; during the traverse for the third-level matching unit nodes, the match start position and match end position of C1 and C2 are changed.

The processing of a node in which the match start position or match end position exceeds the effective detection range includes:

determining whether matching unit node B1 has a sub-node, deleting the contents recorded in matching unit node B1 or identifying matching unit node B1 as "not be used for pattern matching any more" instead of deleting matching unit node B1 because the result in this embodiment is there is a sub-node C1. This embodiment shows the case of identifying matching unit node B1 as "not be used for pattern matching any more" and the case of deleting the contents of matching unit node B1 (i.e. reset to zero).

Figure 9G:
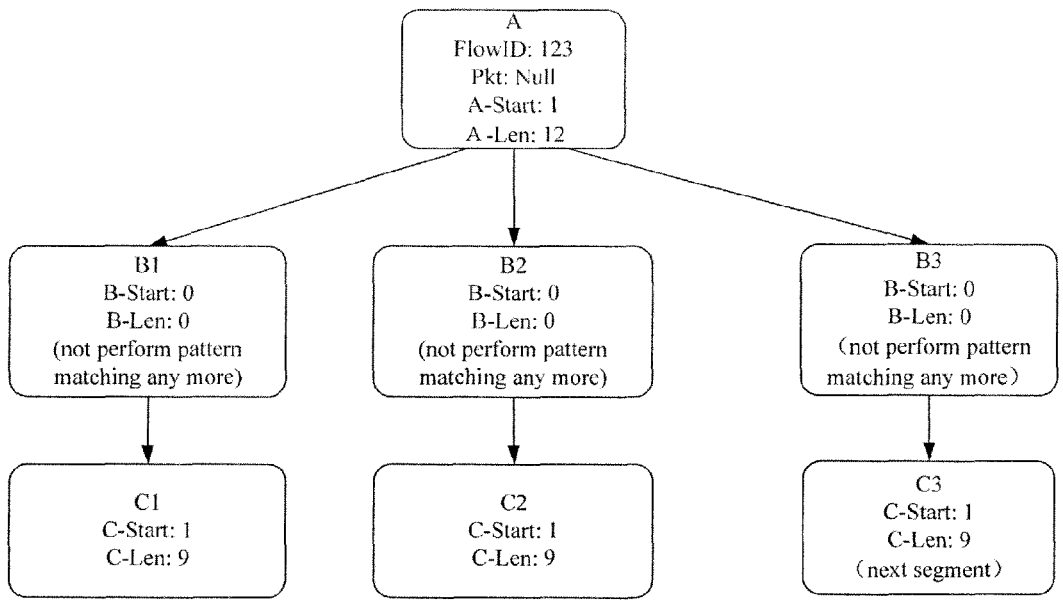

As shown in FIG. 9G, segment 4 is received and the width traverse is performed. During the traverse for the first-level matching unit node, the match start position and the match end position of the root node is adjusted. During the traverse for the second-level matching unit nodes, node B1 is omitted. After the traverse for B2, because the match end position of node B2 exceeds the effective detection range, node B2 is identified as "not be used for pattern matching any more" or the contents recorded in node B2 are deleted. A new sub-node C3 is added during the traverse for node C3. Because the match end position of B3 exceeds the effective detection range, B3 is also identified as "not be used for pattern matching any more" or the contents recorded in B3 are deleted.

Figure 9H:
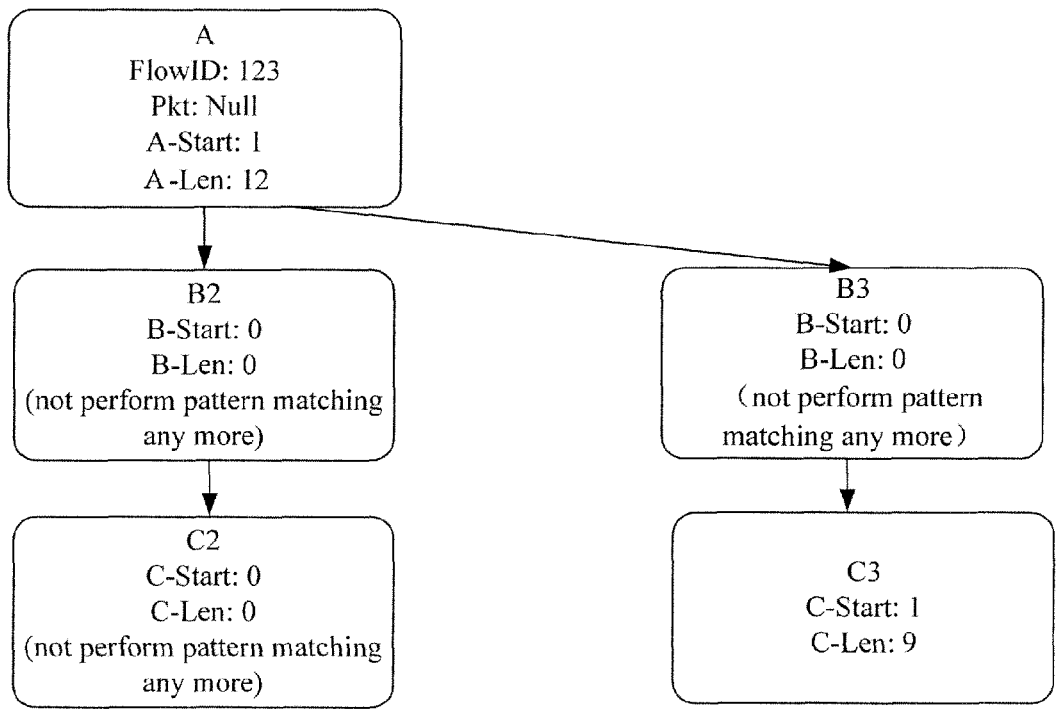

As shown in FIG. 9H, during the traverse for the third-level matching unit nodes, the traverse is performed for nodes C1, C2 and C3 for segment 4, and the match start position and match end position of the node C1 and those of the nodes C2 and C3 are adjusted respectively. Because the match start position and match end position of C1 exceed the effective detection range and nodes on the path where C1 is located do not need to be traversed, the path is deleted. Specifically, the path is deleted through:

determining that node C1 has no sub-node and deleting matching unit node C1; and determining that parent node B1 of node C1 has been identified as "not be used for pattern matching any more" or has no contents recorded therein, deleting matching unit node B1.

Furthermore, because the match start position and match end position of node C2 exceed the effective detection range, node C2 is identified as "not be used for pattern matching any more" or the contents recorded in node C2 are deleted. Certainly, because node C2 has no sub-node, node C2 may be deleted.

Figure 9I:
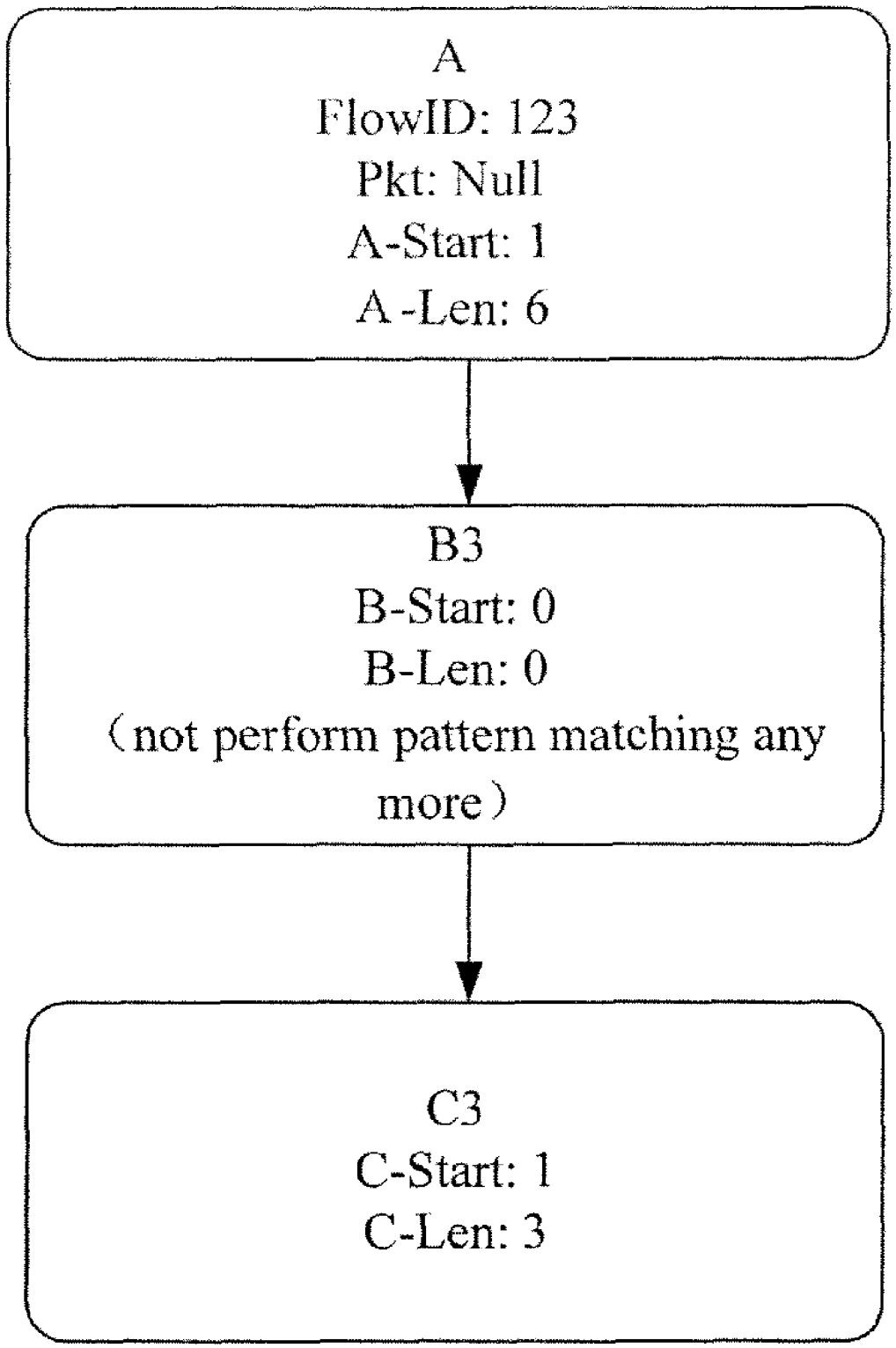

As shown in FIG. 9I, segment 5 is received and the width traverse is performed. During the traverse for the first-level node, the match start position and match end position of the root node are adjusted. Because the second-level nodes need not be traversed, the traverse is performed for the third-level nodes directly. Specifically, the traverse is performed for C3. Because C3 is matched with "ghk", the pattern matching succeeds. The flow information is released, i.e. all the matching units are deleted.

Embodiment 4

This embodiment is also for the single-pattern matching. The flow status information includes the postfix information of the previous segment, the match start position and match end position of a first matching rule. In this embodiment, the flow status information is also organized in the manner of a status tree, i.e. each node of the status tree records one matching unit, and according to the order of the matching rules, the node where a matching unit corresponding to a next matching rule is located is a sub-node of the node where a matching unit corresponding to a current matching rule is located. Different from the embodiment 3, each node in this embodiment is configured with a space for storing a pre-stored character. When a segment is received, the segment is taken as the current segment, and whether there is a status tree of the current pattern for the transmission flow to which the current segment belongs is determined. If there is a status tree of the current pattern for the transmission flow to which the current segment belongs, the current segment is combined with the postfix of the previous segment in the current node to form a target segment, and the postfix of the previous segment in the current node is deleted. Then the pattern matching is performed for the target segment according to the status tree. If there is no status tree of the current pattern for the transmission flow to which the current segment belongs, a status tree of the current pattern is created for the transmission flow to which the current segment belongs, and the current segment is taken as the target segment and the pattern matching is performed for the target segment according to the status tree.

Figure 10:
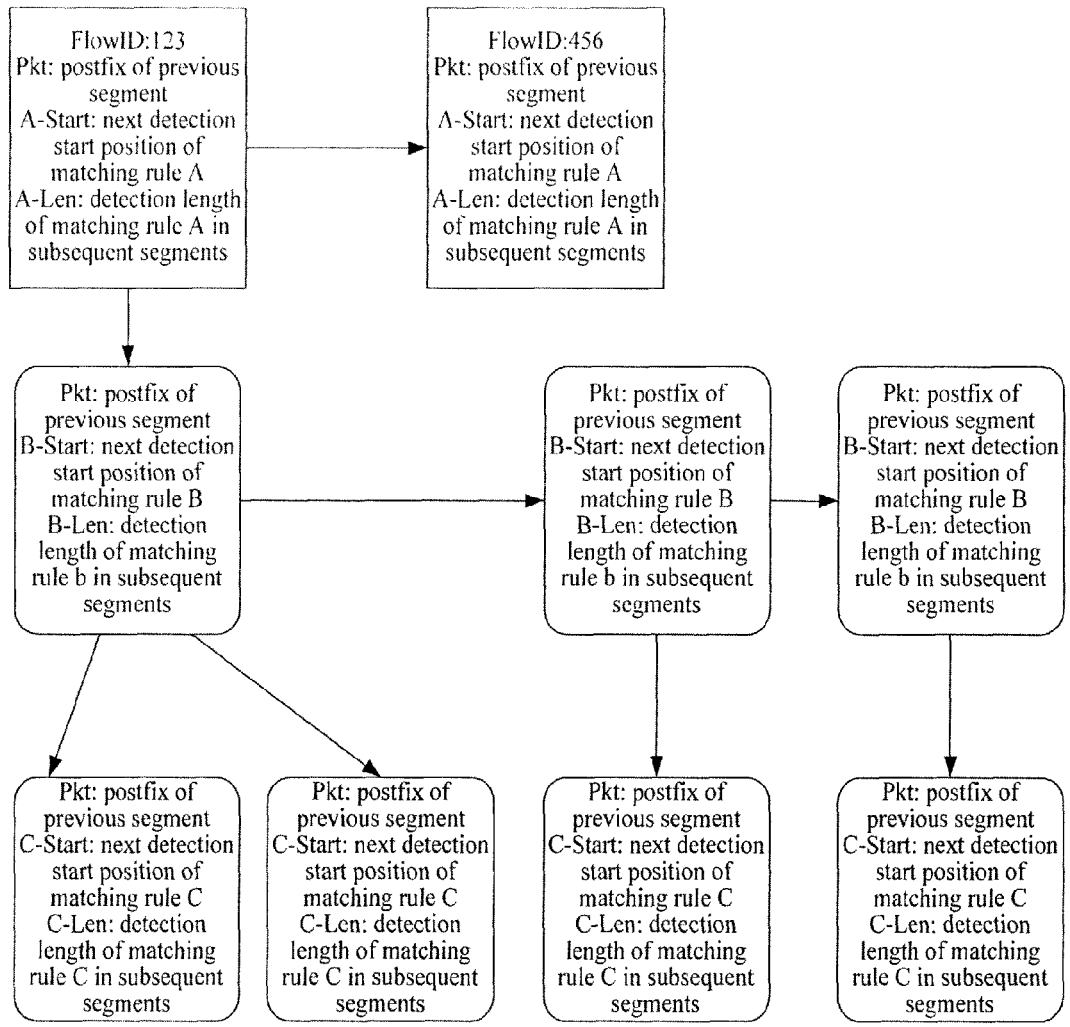
FIG. 10 is a schematic diagram illustrating a status tree in embodiment 4.

FIG. 10 is a schematic diagram illustrating a status tree in this embodiment. As shown in FIG. 10, the status tree in FIG. 10 is different from that in FIG. 8 in that only the root node in the status tree in FIG. 8 has a Pkt field while each node in the status tree in FIG. 10 has a Pkt field.

In the pattern matching of this embodiment, Block 701 in embodiment 3 is changed to: determining whether there is a status tree corresponding to the current pattern for the transmission flow to which the current segment belongs, if there is a status tree corresponding to the current pattern for the transmission flow to which the current segment belongs, performing Block 704; otherwise, performing Block 703. In other words, Block 702 is omitted in this embodiment. Accordingly, Block 703 is changed to: creating the status tree corresponding to the current pattern for the transmission flow. Block 704 is changed to: obtaining one node in the status tree, taking the obtained node as the current node and taking the postfix of the previous segment in the current node as a prefix of the current segment to form the target segment. The postfix of the previous segment in the current node is then deleted and the pattern matching is performed for the target segment according to the current matching unit. Subsequently, the pattern matching is performed similarly to Blocks 705 to 712 in embodiment 3.

Embodiment 5

This embodiment is still for the single-pattern matching. The flow status information is the same as that in embodiments 1 and 2. The pattern matching in this embodiment is performed according to an order of the matching rules strictly. If a segment does not match the current matching rule fully, the whole contents of this segment are taken as the prefix of a next segment, acting as the pre-stored character.

Figure 11:
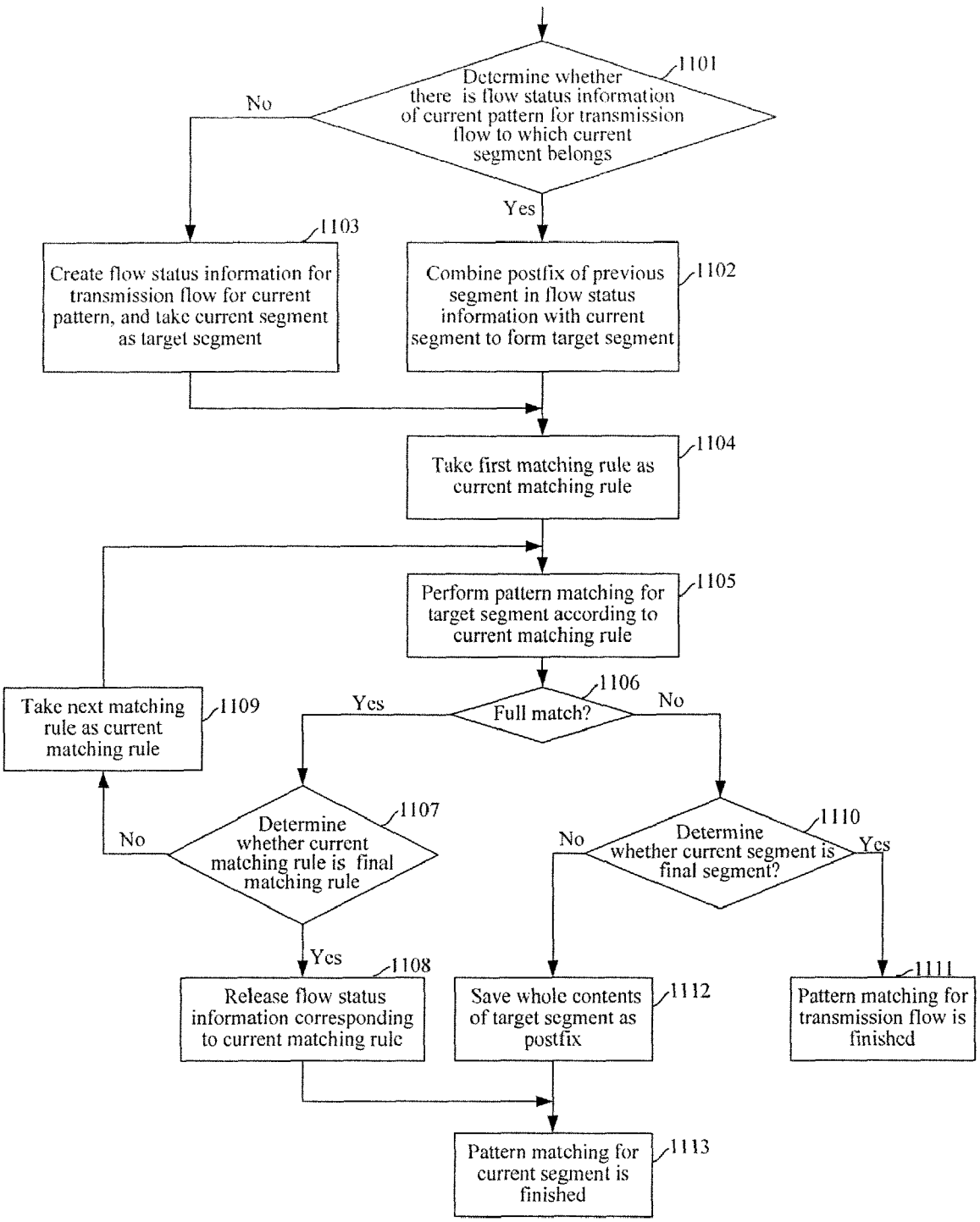
FIG. 11 is flowchart illustrating a method of pattern matching according to embodiment 5 of the present invention.

FIG. 11 is a flowchart illustrating the method of pattern matching according to embodiment 5 of the present invention. As shown in FIG. 11, the method includes:

Blocks 1101-1103: It is determined whether there is flow status information corresponding to the current pattern for the transmission flow to which the current segment belongs. If there is the flow status information corresponding to the current pattern for the transmission flow to which the current segment belongs, the postfix of the previous segment in the flow status information is combined with the current segment to form the target segment, and Block 1104 is performed. Otherwise, the flow status information corresponding to the current pattern for the transmission flow is created, and the current segment is taken as the target segment.

Herein, before the combination, it may be determined whether the postfix of the previous segment acting as the pre-stored character is null. If the postfix of the previous segment acting as the pre-stored character is null, the current segment is taken as the target segment directly. Otherwise, the current segment is combined with the postfix of the previous segment in the flow status information.

After the combination, the space for storing the postfix of the previous segment acting as the pre-stored character may be cleared.

Block 1104: The first matching rule is taken as the current matching rule.

Blocks 1105-1106: The pattern matching is performed for the target segment according to the current matching rule and whether the matching result is full match is determined. If the matching result is full match, Block 1107 is performed; otherwise, Block 1110 is performed.

Blocks 1107-1109: Whether the current matching rule is the final matching rule is determined. If the current matching rule is the final matching rule, the flow status information corresponding to the current matching rule is released, and the pattern matching for the current segment is finished, and the procedure terminated. Otherwise, the next matching rule is taken as the current matching rule and Block 1105 is performed again.

In this embodiment, the pattern matching for each segment is performed strictly following the order of the matching rules. Only after the current matching rule is fully matched, the pattern matching for the target segment is performed according to the next matching rule. Therefore, when the target segment is fully matched with the current matching rule and the current matching rule is the final matching rule of the current pattern, it indicates that the pattern matching for the target segment has been performed according to all the matching rules and the pattern matching is successful in all the matching rules. At this time, besides releasing the flow status information corresponding to the current matching rule and determining that the pattern matching for the current segment is finished, it can also be concluded that the pattern matching for the target segment is successful. Subsequently, after a next segment is received, the pattern matching for the next segment is performed.

Blocks 1110 to 1111: Whether the current segment is the final segment is determined. If the current segment is the final segment, it is determined that the pattern matching for the transmission flow to which the current segment belongs is finished and the procedure is terminated; otherwise, Block 1112 is performed.

According to the matching principle of this embodiment, the pattern matching for the target segment according to the next matching rule is performed only if the current matching rule is fully matched. If the target segment is fully matched with the current matching rule and the current segment is the final segment, the pattern matching need not be performed any more. Therefore, it can be determined that the pattern matching for the transmission flow to which the current segment belongs is finished. Because the final segment is not fully matched with all the matching rules, it indicates that the matching for the transmission flow does not succeed. At this time, the flow status information of the transmission flow corresponding to the current pattern may be released.

Blocks 1112-1113: The whole contents of the target segment are saved as the postfix of a previous segment of a next segment, and it is determined that the pattern matching for the current segment is finished. At this time, because the target segment is not fully matched the current matching rule, the matching result of the current segment is partial match. Subsequently, after a next segment is received, the pattern matching in this procedure may be performed again.

It can be seen from the above Blocks that, if the target segment is not fully matched with the last matching rule in this embodiment, the pattern matching for the target segment according to subsequent matching rules is not performed. Instead, the whole contents of the target segment are saved and combined with a next segment received to form a new target segment, and then the pattern matching is performed for the new target segment.

In embodiments 1 to 5, the determination on whether there is flow status information corresponding to the current pattern for the transmission flow to which the current segment belongs and the creation of the flow status information may only be performed at the first time that the pattern matching is performed for the segment of the transmission flow. Specifically, before the determination on whether there is flow status information corresponding to the current pattern for the transmission flow to which the current segment belongs, the method further includes: obtaining the first segment of the transmission flow and taking the first segment as the current segment; after the pattern matching for the current segment, determining whether the transmission flow to which the current segment belongs has a segment for which the pattern matching is not performed; if the transmission flow to which the current segment belongs has a segment for which the pattern matching is not performed, obtaining the next segment in the transmission flow, taking the obtained next segment as the current segment and performing the pattern matching for the current segment again; otherwise, terminating the pattern matching for the transmission flow.

In addition, after the pattern matching for the current segment, pre-configured operations may be performed for the current segment according to a matching result, e.g. forwarding or discarding the current segment.

All of the above five embodiments can realize segment-based pattern matching. On the premise of eliminating the traditional flow-reassembly, the method provided by the five embodiments can cooperate with the methods of pattern matching such as BM, BF which also relate to the matching policies, thereby avoiding the modification to the protocol stack and reducing the occupation of the system memory, which not only increases the system performance without increasing time delay of various application services, but also is capable of avoiding false negative theoretically due to the elimination of the flow-reassembly. Although there are some differences among the above five embodiments, embodiments 1 to 4 are similar and are only different from each other in the configuration of the pre-stored characters or the organization of the matching units. Specifically, only a little amount of data, i.e. the pre-stored character, need be copied in embodiments 1 and 2; and compared with embodiments 1 and 3, relatively more data need be copied in embodiments 2 and 4, but still far less than the amount of cached segments in the conventional methods. Compared with embodiments 1 to 4, embodiment 5 is much simpler but needs to copy relatively more data.

The above five embodiments relate to the single-pattern matching. The method of the present invention will be explained in detail herein after with references to embodiments regarding multi-pattern matching.

Embodiment 6

This embodiment relates to the multi-pattern matching. The state of a Finite State Machine (FSM) after the pattern matching for a segment is stored in the flow status information. When performing the pattern matching for a next segment, the stored state of the FSM is taken as an initial state of the FSM.

The multi-pattern matching refers performing pattern matching for multiple matching patterns at the same time. Take the Aho-Corasick algorithm as an example, the initial state and the final state of the FSM are pre-configured. States other than the initial state and the final state are intermediate states. The payload of a segment is used as a drive of the FSM. The state of the FSM transits along with the input of the payload string with a pre-defined length. When the FSM transits to the final state, it indicates that the pattern matching succeeds.

Figure 12:
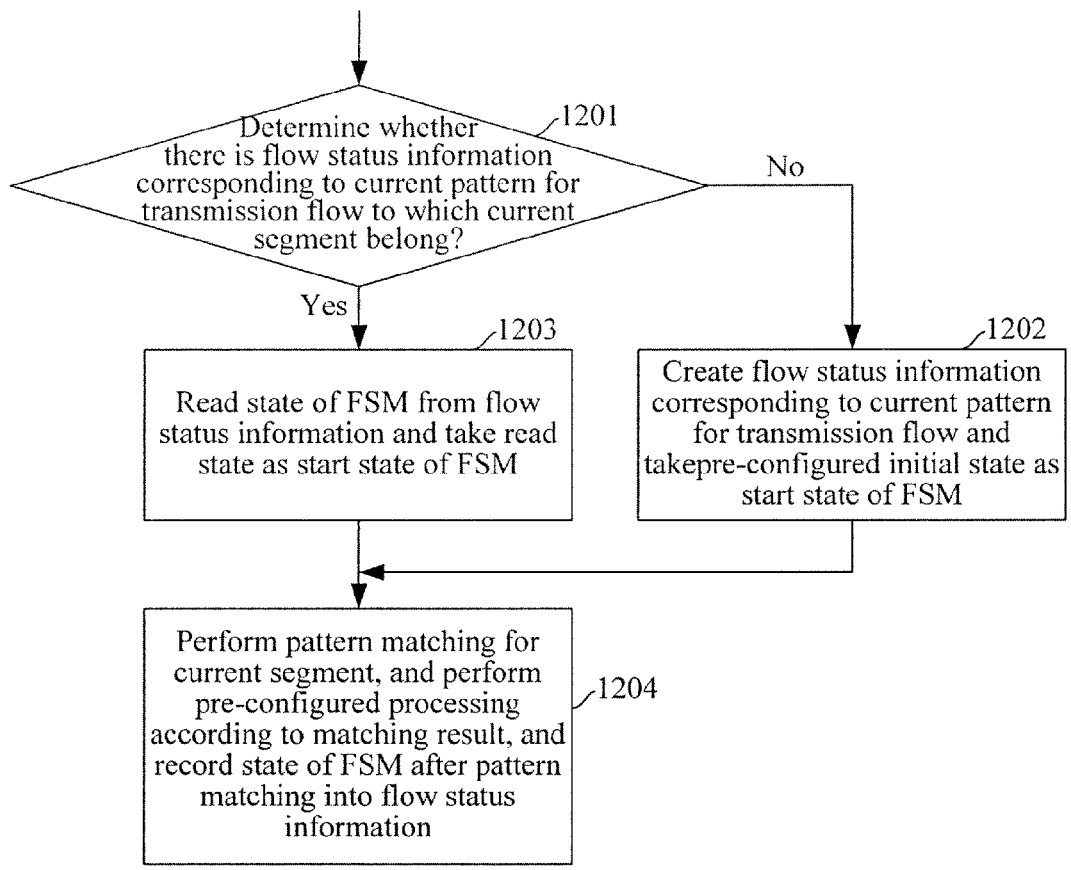
FIG. 12 is a flowchart illustrating a method of pattern matching according to embodiment 6 of the present invention.

In this embodiment, the FSM used for the pattern matching of the transmission flow is configured in advance. After a segment is received, the pattern matching is performed according to the flowchart shown in FIG. 12. As shown in FIG. 12, the detailed process of the pattern matching includes:

Block 1201: It is determined whether there is flow status information corresponding to the current pattern for the transmission flow to which the current segment belongs. If there is the flow status information corresponding to the current pattern for the transmission flow to which the current segment belongs, Block 1203 is performed; otherwise, Block 1202 is performed.

Block 1202: The flow status information corresponding to the current pattern for the transmission flow is created. The pre-configured initial state is taken as the start state of the FSM, and Block 1204 is performed.

Block 1203: The state of the FSM is read from the flow status information and the read state is taken as the start state of the FSM.

Block 1204: The pattern matching is performed for the current segment, and pre-configured processing is performed according to a matching result. Further, the state of the FSM after the pattern matching is recorded into the flow status information.

The pre-configured processing according to the matching result may at least include: forwarding the segment and discarding the segment.

It can be seen from the above that the state of the FSM after the pattern matching for a segment is taken as the start state of the FSM for performing the pattern matching for a next segment. Thus, the state of the FSM during the pattern matching may be ensured to be continuous effectively, and the pattern matching of the transmission flow can be realized without the segment-reassembly.

Certainly, Blocks 1201 and 1202 may be performed only when the current segment is the first segment in the transmission flow, and for subsequent segments, the process can start from Block 1203 directly.

Furthermore, after Block 1204, the process may further include determining whether there is a segment for which the pattern matching has not been performed in the transmission flow of the current segment. If there is a segment for which the pattern matching has not been performed in the transmission flow of the current segment, a next segment is taken as the current segment and Block 1202 is performed; otherwise, it is determined that the pattern matching for the transmission flow is finished.

Embodiment 7

Figure 13:
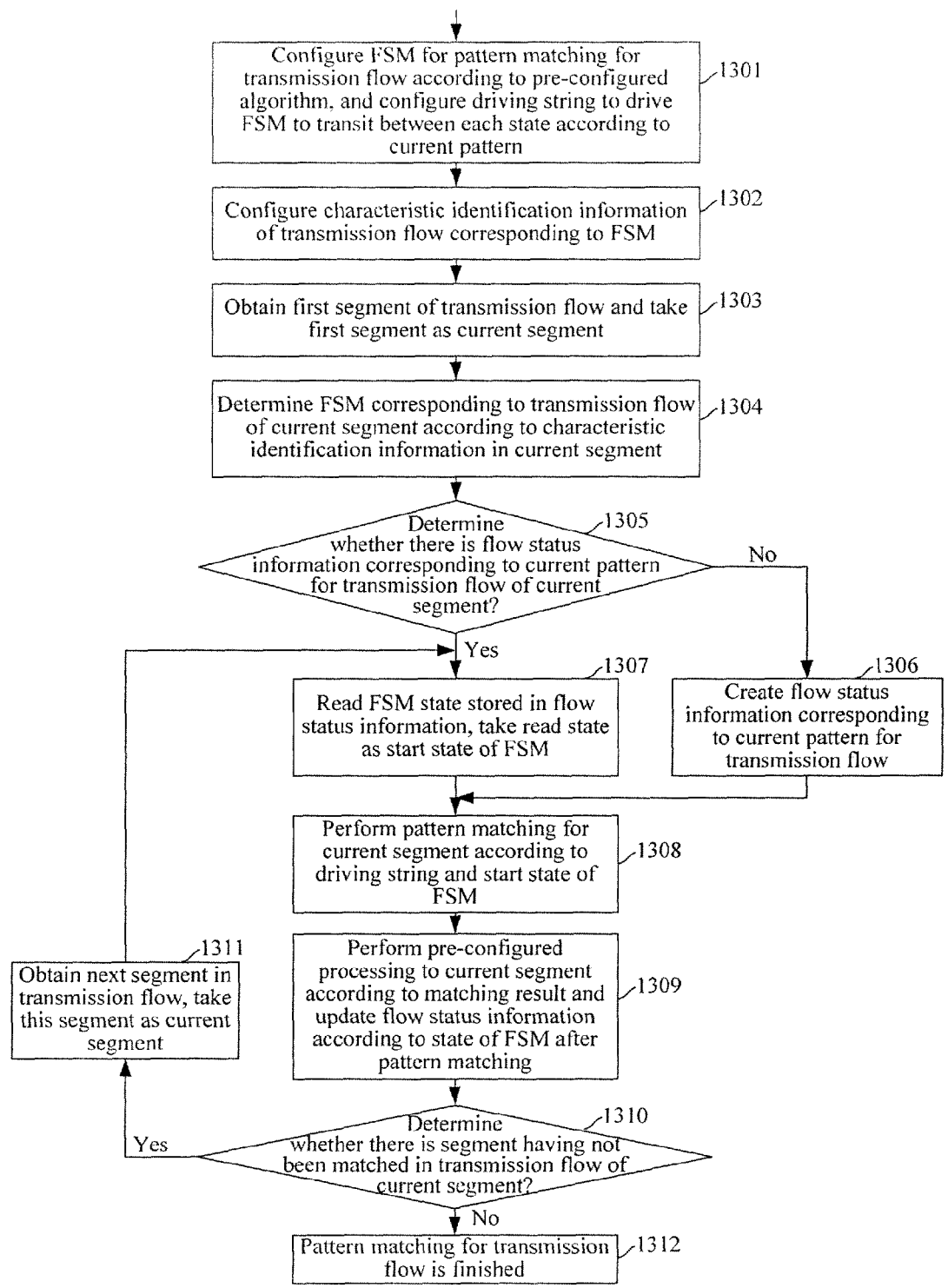
FIG. 13 is a flowchart illustrating a method of pattern matching according to embodiment 7 of the present invention.

This embodiment is an extension of embodiment 6. FIG. 13 is a flowchart illustrating the pattern matching of this embodiment. As shown in FIG. 13, the method includes:

Block 1301: An FSM is configured for pattern matching of the transmission flow according to a pre-configured algorithm, and a driving string used to drive the FSM to transit between each state is configured according to the current pattern.

The driving string configured in this Block has a pre-defined length which is an integer larger than or equal to 1. For example, the FSM has two states: state 0 and state 1. The driving character from state 0 to state 1 is "h". Thus, if the driving character "h" is received when the FSM is in state 0, the FSM transits to state 1.

Furthermore, the state transitions of the FSM when a non-driving string is received may also be configured in advance, e.g. transiting to the initial state, transiting to an opposite direction along the original line.

Block 1302: Characteristic identification information of the transmission flow corresponding to the FSM is configured.

The objective of this Block is to differentiate transmission flows when receiving different transmission flows, so as to find the FSM corresponding to each transmission flow in subsequent Blocks conveniently.

Blocks 1303-1304: A first segment of the transmission flow is obtained and the first segment is taken as the current segment. The FSM corresponding to the transmission flow where the current segment is located is determined according to the characteristic identification information of the transmission flow in the current segment.

In this Block, before obtaining the first segment, the method further includes keeping the sequence of each segment in the transmission flow. Then the segment in the first position is obtained according to the sequence of the segments.

Block 1305: It is determined whether there is the flow status information corresponding to the current pattern for the transmission flow where the current segment is located. If there is the flow status information corresponding to the current pattern for the transmission flow where the current segment is located, Block 1307 is performed; otherwise, Block 1306 is performed.

Block 1306: The flow status information corresponding to the current pattern for the transmission flow is created. The pre-configured initial state is taken as the start state of the FSM, and Block 1308 is performed.

When creating the flow status information in this Block, the state of the FSM in the flow status information is recorded as the initial state.

Block 1307: The FSM state stored in the flow status information is read and taken as the start state of the FSM.

Blocks 1308-1309: The pattern matching is performed for the current segment according to the driving string and the start state of the FSM. Pre-configured processing is performed for the current segment according to a matching result of the pattern matching. And the flow status information is updated according to the state of the FSM after the pattern matching.

The pattern matching in this embodiment may be performed through extracting the payload from a segment. Specifically, strings from the payload of the current segment are extracted in turn according to the length of the pre-configured driving string. The extracted strings are used as driving strings for corresponding FSM respectively to drive the FSM to perform the state transitions. After the extraction of the payload of the current segment, the matching result of the pattern matching is obtained according to the matched pattern obtained during the state transitions of the FSM.

In detail, the pattern matching using the FSM includes:

a. determining whether the payload currently inputted to the FSM is matched with a transition condition, if the payload currently inputted to the FSM is matched with a transition condition, proceeding to Block b; otherwise, proceeding to Block c.

b. the FSM transiting from the current start state to a next state, and proceeding to d.

c. the FSM transiting to a pre-configured state, wherein the pre-configured state may be the initial state, or other specified states, and proceeding to d.

d. determining whether the state of the FSM is transited to the final state; if yes, determining that one of the multiple patterns is matched, reporting a result of success match of the pattern, and updating the flow status information corresponding to the transmission flow using the state of the FSM after the transitions, then proceeding to e; otherwise, updating the flow status information corresponding to the transmission flow using the state of the FSM after the transitions, and proceeding to f.

e. determining whether there is a pattern not matched successfully; if yes, proceeding to f; otherwise, determining that the matching result of the current pattern is full match, releasing the flow status information and terminating the procedure.

f. determining whether there is a next payload of the current segment; if yes, receiving the next payload and returning to a; otherwise, determining that the matching result of the current segment is mismatch, and performing Block 1310.

Certainly, the length of the driving string herein may be an integer larger than or equal to 1.

The pre-configured processing for the current segment according to the matching result may include: performing operations corresponding to this pattern according to a pre-configured policy if the matching result is full match; forwarding the current segment if the matching result is mismatch. The pre-configured policy may be discarding the current segment.

In addition, the state of the FSM after the pattern matching may be recorded in the flow status information corresponding to the transmission flow to which the current segment belongs. After a next segment is received, the transmission flow and the flow status information corresponding to the received segment are determined according to the characteristic identification information of the received segment. Thus, the matching for multiple transmission flows with one FSM simultaneously may be realized, and the matching for multiple transmission flows with multiple FSMs may be realized too.

Blocks 1310-1312: It is determined whether there is a segment for which the pattern matching is not performed in the transmission flow to which the current segment belongs. If there is a segment for which the pattern matching is not performed in the transmission flow of the current segment, the next segment in the transmission flow is obtained and is taken as a new current segment, and Block 1307 is performed. Otherwise, the pattern matching for the transmission flow is finished.

Figure 14:
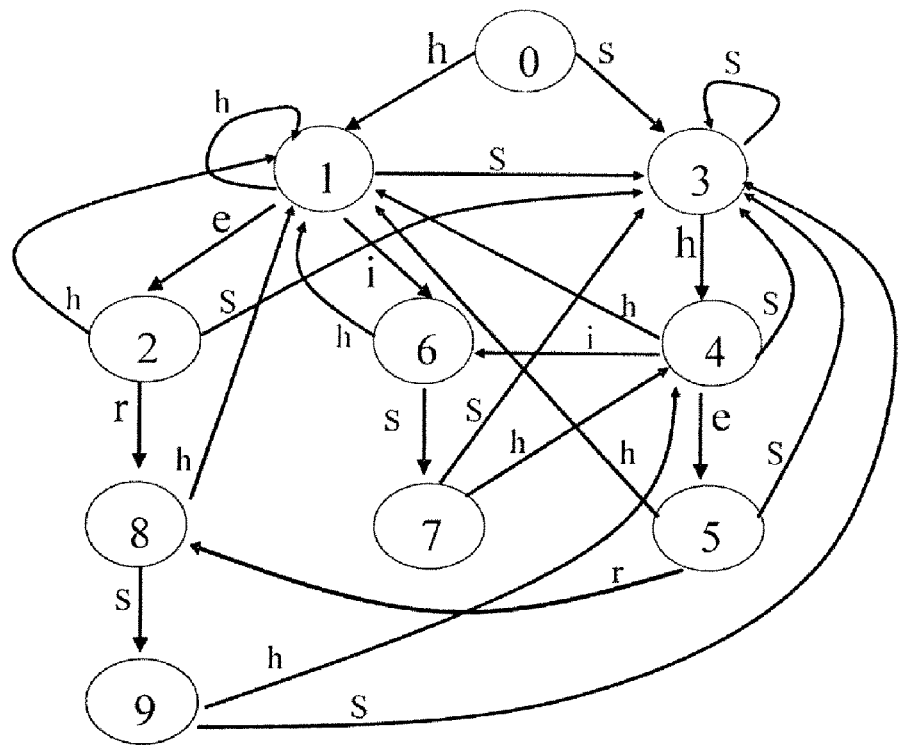
FIG. 14 is a schematic diagram illustrating an FSM constructed according to the AC algorithm.

FIG. 14 is a schematic diagram illustrating an FSM constructed according to the AC algorithm. As shown in FIG. 14, the FSM is used for matching and recognizing four patterns: he, she, his and hers. State 0 is the initial state. States 1, 3, 4, 6 and 8 are intermediate states. States 2, 5, 7 and 9 are final states. The payload of a segment is used as the drive of the FSM during the pattern matching. The state of the FSM transits along with the input of the driving string with the pre-defined length. When the state transits to the final state of the FSM, it indicates that the pattern is matched. Supposing the length of the driving string in FIG. 14 is one character. At this point, the driving string is called a driving character.

The arrows in FIG. 14 show the directions of the transitions. The character on the arrow is the driving character for the state transition indicated by the arrow. For example, the character on the arrow between states 0 and 1 is "h", which represents that when the FSM is in state 0, the state of the FSM will transit from state 0 to state 1 if the driving character "h" is inputted.

For example, the states that pattern "he" goes through are: state 0→state 1→state 2; the states that pattern "she" goes through are: state 0→state 3→state 4→state 5; the states that pattern "his" goes through are: state 0→state 1→state 6→state 7; the states that pattern "hers" goes through are: state 0→state 1→state 2→state 8→state 9.

Figure 15:
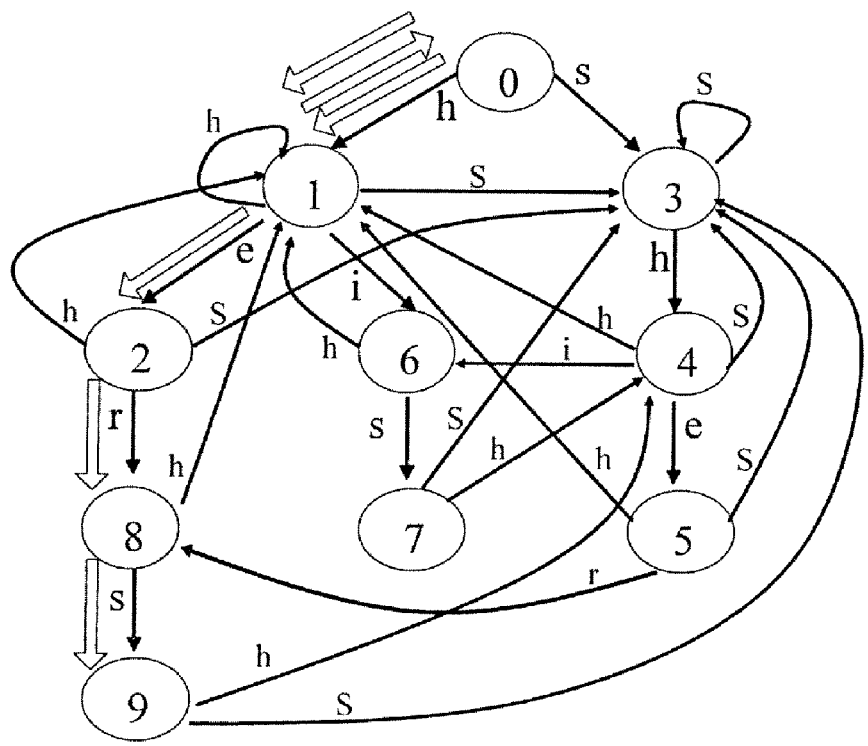
FIG. 15 is a schematic diagram illustrating state transitions during pattern matching for a segment with a payload "hxhers" using the FSM in FIG. 14.

FIG. 15 is a schematic diagram illustrating the state transitions of the FSM when performing pattern matching for the segment with a payload "hxhers". The start state of the FSM is state 0. The state transitions of the FSM during the pattern matching are as follows: state 0 (input h)→state 1 (input x)→state 0 (input h)→state 1 (input e)→state 2 (input r)→state 8 (input s)→state 9. States 2 and 9 are final states representing that patterns "he" and "hers" are successfully matched during the pattern matching of the FSM for the payload "hxhers".

If the payload "hxhers" is divided by an attacker into two segments, after the two segments is received and the sequence of them is kept, the payload of the first segment is "hxh" and the payload of the second segment is "ers". Thus, when performing the pattern matching for the first segment, the start state is state 0 and the state transitions of the FSM are as follows: state 0 (input h)→state 1 (input x)→state 0 (input h)→state 1. After the pattern matching for the first segment, state 1 is recorded in the flow status information, where state 1 is the state that the FSM transits to after the final character "h" is inputted. The pre-configured processing may be performed for the first segment. During the pattern matching for the second segment, the state of the FSM, i.e. state 1 which is recorded in the flow status information, is taken as the start state. The payload of the second segment is "ers" and the start state is state 1, the state transitions of the FSM are as follows: state 1 (input e)→state 2 (input r)→state 8 (input s)→state 9. Where states 2 and 9 are final states representing that patterns "he" and "hers" are successfully matched in the payload "hxhers".

As can be seen from the above analysis, through the method of pattern matching provided by this embodiment, the final state of the current pattern matching is saved and taken as the start state of the pattern matching for the next segment, thereby the matching result for the patterns in different segments is completely the same as the matching result for the patterns in the same segment. Therefore, the pattern matching of the transmission flow can be realized without the flow-reassembly of segments, which avoids the false negative.

On the contrary, if state 1 to which the FSM transits after the final character "h" of the first segment is inputted is not saved, the start state corresponding to the second segment with the payload of "ers" is state 0. The state transitions of the FSM are as follows: state 0 (input e)→state 0 (input r)→state 0 (input s)→state 0. State 0 is the initial state of the FSM. The pattern is not matched successfully. Therefore, in case that the reassembly and recovering of the segments of the transmission flow are not performed, the pattern matching for attacked patterns in different segments will lead to false negative if the pattern matching provided by this embodiment is not adopted.

In detailed applications, if there is a strict requirement for the delay performance, a delay control may further be performed for the operation of sequence keeping of the segments of the transmission flow on basis of this embodiment so that the time delay is further reduced. In other words, before the operation of sequence keeping of the received segments of the transmission flow, the received segments are cached firstly. After the operation of the sequence keeping, the pattern matching is performed for the segments which have been kept the sequence within a pre-defined delay, and the segments which have not been kept the sequence within the pre-defined delay are discarded. Through the above operations, the time delay of the sequence keeping is controlled, which further reduces the time delay and the occupation of the memory.

It can be seen from the above seven embodiments that, the method for pattern matching provided by embodiments of the present invention is a universal method based on the transmission flow, applicable to both the multi-pattern matching and the single-pattern matching. Although only the BF and AC algorithms are taken as examples in the embodiments, those skilled in the art should understand that the method provided by embodiments of the present invention is applicable to, but not limited to, BM, AC, PCRE and BF algorithms. It also can be seen from the above embodiments that the organization manners of the flow status information includes, but not limited to, the status tree and the FSM.

The flow status information is released when the matching of the current pattern is successful or failed. Besides, the flow status information is also dynamically released when the transmission flow is invalid or terminated, so as to reduce the occupation of the memory to the most extent.

Meanwhile, the flow status information is saved corresponding to different patterns and transmission flows. Therefore, when there are multiple single-patterns in the system, the operation of each single-pattern is performed according to the above flowchart, and multiple pieces of flow status information are created. If there are multiple transmission flows in the system, the operation of each transmission flow is also performed according to the above flowchart, and multiple pieces of flow status information are created. Therefore, the method provided by embodiments of the present invention is applicable to both multiple single-patterns and multiple transmission flows.

Because the flow-reassembly is not needed, the segments need not be cached. It is only necessary to save and maintain the flow status information needed for the detection of each algorithm. Because the FSM does not occupy strings, the most memory occupied by the flow status information of the transmission flow is the maximum length of the string in the single-pattern matching; the least memory occupied is 0. Obviously, the occupation of the system memory is decreased greatly, which not only improves the system performance but also completely avoids the possibility of false negative theoretically. Meanwhile, the modification of the protocol stack is avoided, and the time delay in various application services is not increased. Thus, the flow-based pattern matching is realized with a relatively lower cost.

Accordingly, embodiments of the present invention provide apparatuses of pattern matching to perform the methods of pattern matching in embodiments 1 to 7.

Figure 16:
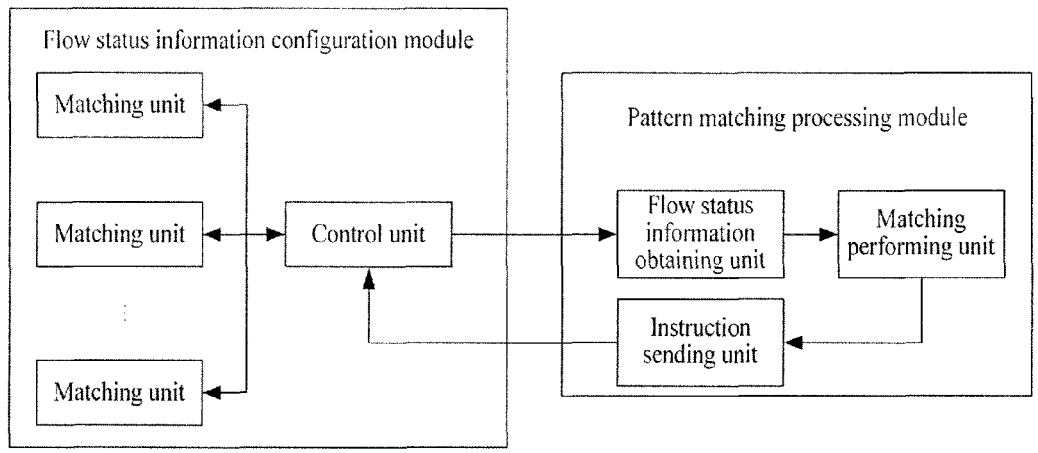
FIG. 16 is a schematic diagram illustrating a structure of an apparatus of pattern matching corresponding to embodiments 1 to 5.

FIG. 16 is a schematic diagram illustrating an apparatus of pattern matching applicable to embodiments 1 to 5, which shows detailed structures based on FIG. 2. As shown in FIG. 16, the apparatus of pattern matching includes: a flow status information configuration module and a pattern matching processing module. The flow status information configuration module includes: a control unit and at least one matching unit. The pattern matching module includes: a flow status information obtaining unit, a matching performing unit and an instruction sending unit.

Specifically, the control unit in the flow status information configuration module is configured to determine whether there is flow status information corresponding to the current pattern for the transmission flow of the current segment, determine a current matching unit if there is the flow status information corresponding to the current pattern for the transmission flow of the current segment, read the flow status information from the current matching unit and indicate the flow status information to the pattern matching processing unit; create a matching unit and flow status information if there is no flow status information corresponding to the current pattern for the transmission flow of the current segment, record the flow status information in the matching unit, and indicate the flow status information to the pattern matching processing unit. The control unit is further configured to receive an instruction from the matching processing module, add or delete a matching unit according to the instruction received, save a postfix of a previous segment acting as a pre-stored character into flow status information of a designated unit, and adjust a match start position and a match end position of the flow status information in a current matching unit. The matching unit is configured to record the flow status information, and further configured to record the postfix of the previous segment which acts as the pre-stored character when the matching unit is the designated unit. The designated unit may be the first matching unit, or any matching unit. The matching units may be connected in the manner of a status tree, and the first matching unit created is the root node of the status tree.

The flow status information obtaining unit in the matching processing module is configured to obtain the flow status information from the flow status information configuration module and send the obtained flow status information to the matching performing unit. The matching performing unit is configured to combine the postfix information of the previous segment in the received flow status information with the current segment to form a target segment, perform the pattern matching for the target segment according to the flow status information, send a matching result and the pre-stored character to be recorded or send the match start position and match end position to the instruction sending unit. The instruction sending unit is configured to send to the flow status information configuration module the instruction to add, delete or change the flow status information according to the information received.

When the pattern is fully matched, or the transmission flow is invalid and terminated, or the match range is exceeded, the match processing module is further configured to output a matching result.

Figure 17:
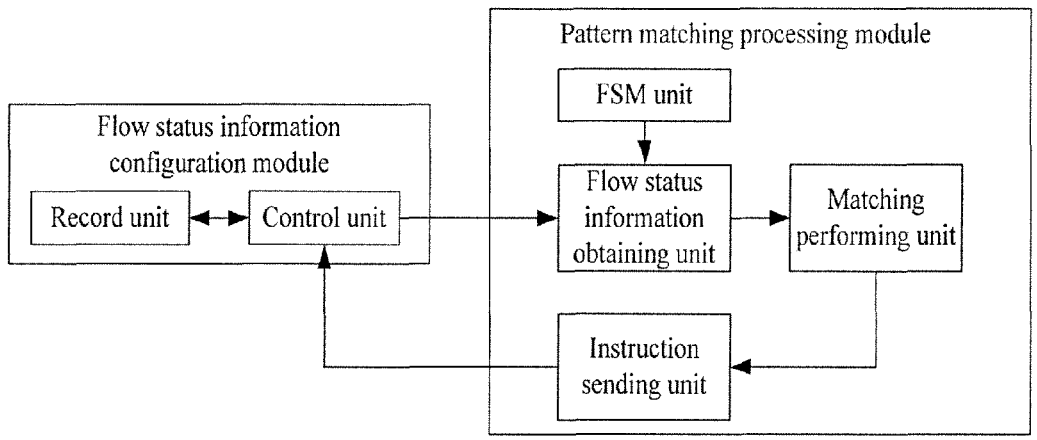
FIG. 17 is a schematic diagram illustrating a structure of an apparatus of pattern matching corresponding to embodiments 6 and 7.

FIG. 17 is a schematic diagram illustrating an apparatus of pattern matching applicable to embodiments 6 and 7. The apparatus of pattern matching includes a flow status information configuration module and a pattern matching processing module. The flow status information configuration module includes a control unit and a record unit. The pattern matching processing module includes a flow status information obtaining unit, an FSM unit, a matching performing unit and an instruction sending unit.

The control unit in the flow status information configuration module is configured to determine whether there is the flow status information corresponding to the current pattern for the transmission flow of the current segment; if there is the flow status information corresponding to the current pattern for the transmission flow of the current segment, read the state of the FSM from the record unit, take the state as a start state and indicate the state to the pattern matching processing module; if there is no flow status information corresponding to the current pattern for the transmission flow of the current segment, record an initial state of the FSM in the record unit, take the initial state of the FSM as the start state and indicate the start state to the pattern matching processing module. The control unit is further configured to receive an instruction from the matching processing module, update the state of the FSM in the record unit according to the instruction received. The record unit is configured to record the state of the FSM according to the indication of the control unit.

The flow status information obtaining unit in the pattern matching processing module is configured to obtain the start state of the FSM from the flow status information configuration module, send the start state to the matching performing unit. The FSM unit is configured to configure the FSM corresponding to the transmission flow and a driving string corresponding to the transmission flow according to the pre-configured algorithm. The matching performing unit is configured to receive the start state of the FSM from the flow status information obtaining unit, read the FSM and the driving string from the FSM unit, perform the pattern matching for a payload of the current segment, and send to the instruction sending unit a state to which the FSM transits after the pattern matching. The instruction sending unit is configured to send the state to which the FSM transits after the pattern matching to the flow status information configuration unit.

In addition, the apparatuses of pattern matching shown in FIG. 16 and FIG. 17 respectively may further include a result processing module. The pattern matching processing module sends the matching result to the result processing module. The result processing module performs pre-configured processing for the current segment according to the matching result.

The foregoing description is only the embodiments of the present invention and is not for use in limiting the protection scope thereof. All the modifications, equivalent replacements or improvements in the scope of the principle of the present invention should be included in the protection scope of the present invention.

What is claimed is:

1. A method for pattern matching, applicable to a transmission flow which is divided into multiple segments, comprising:
   determining whether there is flow status information corresponding to a current pattern for a transmission flow to which a current segment belongs;
   performing pattern matching for the current segment by taking the flow status information as assistant information of the pattern matching if there is the flow status information corresponding to the current pattern for the transmission flow to which the current segment belongs;
   creating the flow status information corresponding to the current pattern for the transmission flow and
   performing pattern matching for the current segment by taking the flow status information as assistant information of the pattern matching if there is no flow status information corresponding to the current pattern for the transmission flow to which the current segment belongs.

2. The method of claim 1, wherein the flow status information comprises postfix information of a previous segment;
performing the pattern matching for the current segment by taking the flow status information as the assistant information of the pattern matching comprises:
combining the postfix information of the previous segment with the current segment to form a target segment; and
performing the pattern matching for the target segment according to the current pattern.

3. The method of claim 2, further comprising:
before combining the postfix information of the previous segment with the current segment, determining whether the postfix information of the previous segment in the flow status information is null;
if the postfix information of the previous segment in the flow status information is null, taking the current segment as the target segment and performing the pattern matching for the target segment according to the current pattern;
otherwise, combining the postfix information of the previous segment with the current segment.

4. The method of claim 2, wherein creating the flow status information corresponding to the current pattern for the transmission flow comprises:
creating a first matching unit, recording rule information of a matching rule of the current pattern, a match start position and a match end position of the matching rule in the first matching unit; and
configuring a designated unit to record the postfix information of the previous segment, and clearing a space allocated to the postfix information of the previous segment in the designated unit.

5. The method of claim 4, further comprising:
before performing the pattern matching for the target segment according to the current pattern, obtaining a matching unit in the flow status information and taking the matching unit obtained as a current matching unit;
wherein performing the pattern matching for the target segment according to the current pattern comprises:
B11: performing the pattern matching for the target segment according to rule information, a match start position and a match end position which are recorded in the current matching unit and obtaining a matching result; if the matching result is full match, proceeding to B12; if the matching result is partial match, proceeding to B13; if the matching result is mismatch, proceeding to B14;
B12: determining whether the current matching unit corresponds to a final matching rule of the current pattern; if the current matching unit corresponds to the final matching rule of the current pattern, terminating the pattern matching for the transmission flow; otherwise, configuring a matching unit corresponding to a next matching rule, performing pattern matching for the target segment after a position of the full match according to the current matching unit, and returning to Block B11 to obtain the matching result;
B13: recording the postfix of the target segment in the designated unit;
B14: modifying the match start position and the match end position of the current matching unit according to the length of the target segment;
B15: determining whether there is a matching unit having not been used for the pattern matching for the target segment; if there is a matching unit having not been used for the pattern matching for the target segment, obtaining a matching unit in the flow status information and taking the matching unit obtained as the current matching unit; otherwise, terminating the pattern matching for the current segment.

6. The method of claim 5, wherein
creating the first matching unit comprises: creating a status tree for storing the flow status information, recording the first matching unit in a root node of the status tree;
obtaining the matching unit in the flow status information comprises: obtaining a node of the status tree and reading the matching unit in the node;
configuring the matching unit corresponding to the next matching rule comprises: adding a sub-node to the node where the current matching unit is located, and configuring the matching unit corresponding to the next matching rule in the added sub-node.

7. The method of claim 5, further comprising:
before terminating the pattern matching for the transmission flow in B12, performing B15.

8. The method of claim 5, wherein recording the postfix of the target segment in the designated unit in B13 comprises:
determining whether there is postfix information recorded in the flow status information;
if there is the postfix information recorded in the flow status information, comparing postfix information to be recorded with the postfix information recorded and recording the postfix information with more characters in the designated unit;
otherwise, recording the postfix information to be recorded in the designated unit.

9. The method of claim 5, further comprising:
after modifying the match start position and the match end position of the current matching unit in B14, determining whether the match start position or the match end position after modified exceeds an effective detection range of the target segment;
if the match start position or the match end position after modified exceeds the effective detection range of the target segment, releasing the flow status information in the current matching unit and performing B15;
otherwise, performing B15.

10. The method of claim 9, wherein releasing the flow status information in the current matching unit comprises one of:
deleting the current matching unit, deleting the flow status information recorded in the current matching unit, and adding an identifier to the current matching unit to indicate that the current matching unit is not used for the pattern matching any more.

11. The method of claim 5, wherein the designated unit is a fixed matching unit or a byte area allocated in a pre-configured storage space;
the method further comprises:
recording a relative position of the postfix of the target segment in the current matching unit upon recording the postfix of the target segment in the B13.

12. The method of claim 4, wherein the designated unit is the current matching unit.

13. The method of claim 2, further comprising:
before performing the pattern matching for the target segment according to the current pattern, obtaining a first matching rule in the flow status information and taking the first matching rule as the current matching rule;
wherein performing the pattern matching for the target segment according to the current pattern comprises:
B21: performing the pattern matching for the target segment according to the current matching rule, and obtaining a matching result; if the matching result is full match, proceeding to B22; otherwise, proceeding to B23;

B22: determining whether the current matching rule is a final matching rule of the current pattern; if the current matching rule is the final matching rule of the current pattern, terminating the pattern matching for the current segment; otherwise, taking a next matching rule as the current matching rule and returning to B21;

B23: determining whether the current segment is a final segment; if the current segment is the final segment, terminating the pattern matching for the transmission flow; otherwise, saving whole contents of the target segment as the postfix information of the previous segment and terminating the pattern matching for the current segment.

14. The method of claim 1, wherein the flow status information comprises a state of a Finite State Machine, FSM; and
wherein performing the pattern matching for the current segment by taking the flow status information as the assistant information for the pattern matching comprises:
performing the pattern matching for the current segment according to the current pattern by taking the state of the FSM in the flow status information as a start state of the FSM for the current pattern matching.

15. The method of claim 14, wherein creating the flow status information corresponding to the current pattern for the transmission flow comprises:
saving a pre-configured initial state of the FSM corresponding to the current pattern in the flow status information.

16. The method of claim 14, further comprising:
before performing the pattern matching for the current segment according to the current pattern, configuring the FSM used for the pattern matching for the transmission flow according to a pre-configured algorithm, and configuring according to the current pattern a driving string of the FSM to drive a state transition;
performing the pattern matching for the current segment according to the current pattern comprises:
obtaining strings from a payload of the current segment according to the length of the driving string of the FSM, inputting the strings into the FSM in turn, driving the FSM to transit from the start state according to the strings inputted and obtaining a matching result.

17. The method of claim 16, wherein driving the FSM to transit from the start state and obtaining the matching result comprises:
B31: determining whether the payload currently inputted to the FSM is the driving string of the FSM; if the payload currently inputted into the FSM is the driving string of the FSM, proceeding to B32; otherwise, proceeding to B33;
B32: transiting by the FSM from the start state to a next state, and proceeding to B34;
B33: transiting by the FSM to a pre-configured state, and proceeding to B34;
B34: determining whether the FSM transits to a pre-configured final state; if the FSM transits to the pre-configured final state, determining that one of multiple patterns is matched, reporting a success matching result of the one pattern, updating the flow status information corresponding to the transmission flow according to a state of the FSM after the state transition and proceeding to B35; otherwise, updating the flow status information corresponding to the transmission flow according to a state of the FSM after the state transition and proceeding to Block B36;
B35: determining whether there is a pattern of which matching is failed; if there is a pattern of which matching is failed, proceeding to B36; otherwise, determining that the matching result of the current pattern is full match, and terminating the procedure;
B36: determining whether there is payload for which the pattern matching is not performed in the current segment, if there is the payload for which the pattern matching is not performed in the current segment, returning to B31 for a next part of the payload in the current segment; otherwise, terminating the pattern matching for the current segment, wherein the matching result is mismatch.

18. The method of claim 16, further comprising:
performing pre-configured processing for the current segment according to the matching result upon obtaining the matching result.

19. The method of claim 14, further comprising:
before determining whether there is the flow status information corresponding to the current pattern for the transmission flow to which the current segment belongs, configuring characteristic identification information of the transmission flow corresponding to the FSM;
before performing the pattern matching for the current segment according to the current pattern, determining the FSM corresponding to the transmission flow to which the current segment belongs according to the characteristic identification information of the transmission flow in the current segment.

20. The method of claim 1, further comprising:
before determining whether there is the flow status information corresponding to the current pattern for the transmission flow to which the current segment belongs, obtaining a first segment in the transmission flow and taking the first segment as the current segment;
after performing the pattern matching for the current segment according to the current pattern, determining whether there is a segment for which the pattern matching is not performed in the transmission flow; if there is the segment for which the pattern matching is not performed in the transmission flow, obtaining a next segment in the transmission flow, taking the next segment as the current segment, and performing the pattern matching for the current segment according to the current pattern; otherwise, terminating the pattern matching for the transmission flow.

21. An apparatus of pattern matching, applicable to a transmission flow which is divided into multiple segments, comprising: a flow status information configuration module and a pattern matching processing module; wherein
the flow status information configuration module is configured to determine whether there is flow status information corresponding to a current pattern for a transmission flow to which a current segment belongs; indicate the flow status information to the pattern matching processing module if there is the flow status information corresponding to the current pattern for the transmission flow to which the current segment belongs; create the flow status information and indicate the flow status information created to the pattern matching processing module if there is no flow status information corresponding to the current pattern for the transmission flow to which the current segment belongs; and the pattern matching processing module is configured to take the flow status information indicated by the flow status information configuration module as assistant information of the pattern matching, and perform the pattern matching for the current segment using the assistant information of the pattern matching.

22. The apparatus of claim 21, wherein the flow status information configuration module comprises a control unit and at least one matching unit;

the control unit is configured to determine whether there is the flow status information corresponding to the current pattern for the transmission flow to which the current segment belongs; determine a current matching unit and read the flow status information from the current matching unit and indicate the flow status information to the pattern matching processing module if there is the flow status information corresponding to the current pattern for the transmission flow to which the current segment belongs; create a matching unit and the flow status information, record the flow status information in the matching unit and indicate the flow status information to the pattern matching processing module if there is no flow status information corresponding to the current pattern for the transmission flow to which the current segment belongs; and the control unit is further configured to receive an instruction from the pattern matching processing module, add or delete the matching unit according to the instruction, record a postfix of a previous segment in a designated unit, adjust a match start position and a match end position of the flow status information in the current matching unit, wherein the postfix of the previous segment is used as a pre-stored character;

the at least one matching unit is configured to record the flow status information.

23. The apparatus of claim 22, wherein the at least one matching unit is further configured to record the postfix of the previous segment used as the pre-stored character if the at least one matching unit is the designated unit.

24. The apparatus of claim 22, wherein multiple matching units are connected in a manner of a status tree, and a first matching unit is a root node of the status tree.

25. The apparatus of claim 23, wherein the pattern matching processing module comprises a flow status information obtaining unit, a matching performing unit and an instruction sending unit;

the flow status information obtaining unit is configured to obtain the flow status information from the flow status information configuration module, and send the flow status information obtained to the matching performing unit;

the matching performing unit is configured to combine the postfix of the previous segment in the flow status information with the current segment to form a target segment, perform the pattern matching for the target segment according to the flow status information, and send a matching result, or the pre-stored character to be recorded, or the match start position and the match end position to the instruction sending unit;

the instruction sending unit is configured to send to the flow status information configuration module an instruction of adding, deleting or changing the flow status information according to the matching result, or the pre-stored character to be recorded, or the match start position and the match end position from the matching performing unit.

26. The apparatus of claim 21, wherein the flow status information configuration module comprises a control unit and a record unit;

the control unit is configured to determine whether there is a state of a Finite State Machine, FSM, corresponding to the current pattern for the transmission flow to which the current segment belongs in the record unit; read a current matching unit from the record unit, read the state of the FSM from the record unit, take the state of the FSM as a start state of the FSM and indicate the start state to the pattern matching processing module if there is the state of the FSM corresponding to the current pattern for the transmission flow to which the current segment belongs; record an initial state of the FSM in the record unit, and indicate the initial state of the FSM as the start state to the pattern matching processing module if there is no the state of the FSM corresponding to the current pattern for the transmission flow to which the current segment belongs;

the record unit is configured to record the state of the FSM according to indication of the control unit.

27. The apparatus of claim 26, wherein the control unit is further configured to receive an instruction from the pattern matching processing module, and update the state of the FSM in the record unit according to the instruction.

28. The apparatus of claim 26, wherein the pattern matching processing module comprises: a flow status information obtaining unit, an FSM unit, a matching performing unit and an instruction sending unit;

the flow status information obtaining unit is configured to obtain the start state of the FSM from the flow status information configuration module, and send the start state to the matching performing unit;

the matching performing unit is configured to receive the start state of the FSM from the flow status information obtaining unit, read the FSM and a driving string from the FSM unit, perform the pattern matching for a payload of the current segment, and send a state to which the FSM transits after the pattern matching to the instruction sending unit;

the instruction sending unit is configured to send the state to which the FSM transits after the pattern matching to the flow status information configuration module.

29. The apparatus of claim 21, further comprising:

a result processing module, configured to perform preconfigured processing for the current segment according to a matching result;

the pattern matching processing module is further configured to send the matching result to the result processing module.

* * * * *